(12) United States Patent
Chang et al.

(10) Patent No.: US 11,692,058 B2
(45) Date of Patent: Jul. 4, 2023

(54) SYNTHESIS OF FUNCTIONAL POLYURETHANES AND POLYESTERS FROM BIOMASS-DERIVED MONOMERS

(71) Applicant: Wisconsin Alumni Research Foundation, Madison, WI (US)

(72) Inventors: Hochan Chang, Madison, WI (US); George W. Huber, Middleton, WI (US); James A. Dumesic, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 214 days.

(21) Appl. No.: 17/186,744

(22) Filed: Feb. 26, 2021

(65) Prior Publication Data

US 2022/0275151 A1 Sep. 1, 2022

(51) Int. Cl.
| | | |
|---|---|---|
| *C08G 18/32* | (2006.01) | |
| *C08G 63/60* | (2006.01) | |
| *C08G 63/676* | (2006.01) | |
| *C08G 18/76* | (2006.01) | |
| *C08G 63/672* | (2006.01) | |

(52) U.S. Cl.
CPC ....... *C08G 63/676* (2013.01); *C08G 18/3206* (2013.01); *C08G 18/3218* (2013.01); *C08G 18/7671* (2013.01); *C08G 63/672* (2013.01)

(58) Field of Classification Search
CPC ............ C08G 18/3218; C08G 18/3206; C08G 63/676; C08G 63/672
See application file for complete search history.

(56) References Cited

PUBLICATIONS

Akindoyo, J.O., Beg, M. D. H., Ghazali, S., Islam, M. R., Jeyaratnam, N., Yuvaraj, A. R., Polyurethane types, synthesis and applications-a review. *RSC Adv.* 6 (2016), pp. 114453-114482.
Alagi, P., Choi, Y.J., Hong, S.C., Preparation of vegetable oil-based polyols with controlled hydroxyl functionalities for thermoplastic polyurethane. *Eur. Polym. J.* 78, 46-60 (2016).
Alonso, D.M., Wettstein, S.G., and Dumesic, J.A., Gamma-valerolactone, a sustainable platform molecule derived from lignocellulosic biomass, *Green Chem.*, 2013, 15, 584-595.
Bond, J.Q., Alonso, D.M., Wang, D., West, R.M., and Dumesic, J.A., Integrated Catalytic conversion of γ-Valerolactone to Liquid Alkenes for Transportation Fuels, *Science*, 2010, 327, 1110-1114.

(Continued)

*Primary Examiner* — Michael L Leonard
(74) *Attorney, Agent, or Firm* — Joseph T. Leone; DeWitt LLP

(57) ABSTRACT

A method of making polyesters and polyurethanes from biomass-derived polyols. The polyol is biomass-derived and has the structure:

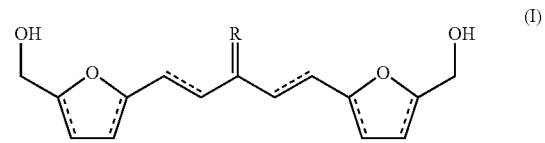

wherein dashed bonds are single or double bonds and R is selected from the group consisting of —OH and =O. Polyurethanes are made by reacting the polyol with a diisocyanate. Polyesters are made by reacting the polyol with a dicarboxylic acid.

35 Claims, 13 Drawing Sheets

(56) References Cited

PUBLICATIONS

Braden, D.J., Henao, C.A., Heltzel, J., Maravelias, C.C. and Dumesic, J.A., Production of liquid Hydrocarbon fuels by catalytic conversion of biomass-derived levulinic acid, *Green Chem.*, 2011, 13, 1755-176.

Chang, H., Motagamwala, A.H., Huber, G.W. and Dumesic, J.A., Synthesis of biomass-derived feedstocks for the polymers and fuels industries from 5-(hydroxymethyl)furfural (HMF) and acetone, *Green Chem.*, 2019, 21, 5532-5540.

Davis, R., Grundl, N., Tao, L., Biddy, M.J., Tan, E.C.D., Beckham, G.T., Humbird, D., Thompson, D.N., and Roni, M.S., Process Design and Economics for the Conversion of Lignocellulosic Biomass to Hydrocarbon Fuels and Coproducts: 2018 Biochemical Design Case Update, 2018, Tech. Rep. NREL/TP-5100-71949.

Diciccio, A.M., Coates, G.W., Ring-opening copolymerization of maleic anhydride with epoxides: A chain-growth approach to unsaturated polyesters. *J. Am. Chem. Soc.* 133, 10724-10727 (2011).

Gürbüz, E.I., Gallo, J.M.R., Alonso, D.M. Wettstein, S.G., Lim, Y.M., and Dumesic, J.A., Conversion of Hemicellulose into Furfural Using Solid Acid Catalysts in γ-Valerolactone, *Angew. Chem., Int. Ed.*, 2013, 52, 1270-1274.

Huber, G.W, Chheda, J.N., Barrett, C.J., and Dumesic, J.A., Production of Liquid Alkanes by Acqueous-Phase Processing of Biomass-Derived Carbohydrates, *Science*, 2005, 308, 1446-1450.

Li, Y., Sarkanen, S., Alkylated kraft lignin-based thermoplastic blends with aliphatic polyesters. *Macromolecules.* 35, 9707-9715 (2002).

Luterbacher, J.S., Rand, J.M., Alonso, D.M., Han, J., Youngquist, J.T., Maravelias, C.T., Pfleger, B.F. and Dumesic, J.A., Nonenzymatic Sugar Production form Biomass Using Biomass-Derived γ-Valerolactone, *Science*, 2014, 343, 277-280.

Motagamwala, A.H., Huang, K., Maravelias, C.T., and Dumesic, J.A., Solvent System for Effective Near-term Production of Hydroxymethylfurfural (HMF) with Potential for Long-term Process Improvement, *Energy Environ. Sci.*, 2019, 12, 2212-2222.

Moulik, S.P., Basu, D., and Bhattacharya, P.K., Effects of Various Conditions on the Alkaline Degradation of $_D$-Fructose and $_D$-Glucose, *Carbohydr. Res.*, 1978, 63, 165-17.

Nishimura, S., Ikeda, N. and Ebitani, K., Selective hydrogenation of biomass-derived 5-hydroxymethylfurfural (HMF) to 2,5-dimenthylfuran (DMF) under atmospheric hydrogen pressure over carbon supported PdAu bimettalic catalyst, in *Catalysis Today*, Elsevier, 2014, 232, 89-98.

Patil, S.K.R., Lund, C.R.F., Formation and Growth of Humins Via Aldol Addition and condensation during acid-catalyzed conversion of 5-hydroxymethylfurfural. *Energy and Fuels.* 25, 4745-4755 (2011).

Peppas, N.A., Klier, J., Controlled release by using poly(methacrylic acid-g-ethylene glycol) hydrogels. *J. Control. Release.* 16, 203-214 (1991).

Saha B. and Abu-Omar, M.M., Current Technologies, Economics, and Perspectives for 2,5-Dimethylfuran Production from Biomass-Derived Intermediates, *ChemSusChem*, 2015, 8, 1133-1142.

Serrano-Ruiz, J.C., Wang, D., and Dumesic, J.A., Catalytic upgrading of levulinic acid to 5-nonanone, *Green Chem.*, 2010, 12, 574-577.

Sousa, A.F., Vilela, C., Fonseca, A.C., Matos, M., Freire, C.S., Gruter, G-J.M., Coelho, J.F.J. and Silvestre, A.J.D., Biobased polyesters and other polymers from 2,5-furanicarboxylic acid: a tribute to furan excellency, *Polym. Chem.*, 2015, 6, 5961-5983.

Sun, L., Wang, J., Mahmud, S., Jiang, Y., Zhu, J., Liu, X., New insight into the mechanism for the excellent gas properties of poly(ethylene 2,5-furandicarboxylate) (PEF): Role of furan ring's polarity. *Eur. Polym. J.* 118, 642-650 (2019).

Villa, A., Schiavoni, M., Campisi, S., Veith, G.M., and Pratt, L., Pd-modified Au on Carbon as an Effective and Durable Catalyst for the Direct Oxidation of HMF to 2,5-Furandicarboxylic Acid, *ChemSusChem*, 6, 609-612 (2013).

Wang, Y.Y., Wyman, C.E., Cai, C.M., Ragauskas, A.J., Lignin-Based Polyurethanes from Unmodified Kraft Lignin Fractionated by Sequential Precipitation. *ACS Appl. Polym. Mater.* 1, 1672-1679 (2019).

Warlin, N., Garcia Gonzalez, M.N., Mankar, S., Valsange, N.G., Sayed, M., Pyo, S.H., Rehnberg, N., Lundmark, S., Hatti-Kaul, R., Jannasch, P., Zhang, B., A rigid spirocyclic diol from fructose-based 5-hydroxymethylfurfural: Synthesis, life-cycle assessment, and polymerization for renewable polyesters and poly(urethane-urea)s. *Green Chem.* 21, 6667-6684 (2019).

West, R.M., Liu, Z.Y., Peter, M., Gärtner, C.A., and Dumesic, J.A., Carbon-carbon bond formation for biomass-derived furfurals and ketones by aldol condensation in a biphasic system, *J. Mol. Catal. A: Chem.*, 2008, 296, 18-27.

Wettstein, S.G., Alonso, D.M., Chong, Y. and Dumesic, J.A., Production of levulinic acid and gamma-valerolactone (GVL) from cellulose using GVL as a solvent in biphasic systems, *Energy Environ. Sci.*, 2012, 5, 8199.

Wettstein, S.G., Bond, J.Q., Alonso, D.M., Pham, H.N., Datye, A.K., and Dumesic, J.A., RuSn bimetallic catalysts for selective hydrogenation of levulinic; acid to γ-valerolactone, *Appl. Catal.*, B, 2012, 117-118, 321-329.

International Search Report and Written Opinion for PCT Application PCT/US2022/016052 dated May 23, 2022.

Chang, Hochan, et al. Synthesis of biomass-derived feedstocks for the polymers and fuels industries from 5-(hyrdoxymethyl)furfural (HMF) and acetone, Green Chem. 2019, 21, 5532-5540.

Warlin, Niklas, et al. A rigid spirocyclic diol from fructose-based 5-hydroxymethylfurfural: synthesis, life-cycle assessment, and polymerization for renewable polyesters and poly(urethane-urea)s. Green Chem., 2019, 21, 6667-6684.

SYNTHESIS OF FUNCTIONAL POLYURETHANES AND POLYESTERS FROM BIOMASS-DERIVED MONOMERS

FEDERAL FUNDING STATEMENT

This invention was made with government support under DE-EE0008353 awarded by the US Department of Energy. The government has certain rights in the invention.

BACKGROUND

Biomass-derived platform chemicals are promising renewable sources for supplying energy (liquid fuels) and chemicals. For example, 5-(hydroxymethyl) furfural (HMF) is one of the platform chemicals which can produce 2,5-dimethyl furan (DMF) as a gasoline additive or 2,5-furandicarboxylic acid (FDCA) as a polymer precursor. See, for example, S. Nishimura, N. Ikeda and K. Ebitani, in *Catalysis Today*, Elsevier, 2014, vol. 232, pp. 89-98; B. Saha and M. M. Abu-Omar, *ChemSusChem*, 2015, 8, 1133-1142; A. Villa, M. Schiavoni, S. Campisi, G. M. Veith and L. Prati, *ChemSusChem*, 2013, 6, 609-612; and A. F. Sousa, C. Vilela, A. C. Fonseca, M. Matos, C. S. R. Freire, G.-J. M. Gruter, J. F. J. Coelho and A. J. D. Silvestre, *Polym. Chem.*, 2015, 6, 5961-5983. Biomass resources, such as glucose and fructose, have recently been shown to be converted to HMF in organic solvents. (A. H. Motagamwala, K. Huang, C. T. Maravelias and J. A. Dumesic, *Energy Environ. Sci.*, 2019, 12, 2212-2222.) Levulinic acid is another promising platform chemical which can be effectively synthesized from cellulose. (S. G. Wettstein, D. M. Alonso, Y. Chong and J. A. Dumesic, *Energy Environ. Sci.*, 2012, 5, 8199.) The levulinic acid can be converted to GVL as a green solvent for diverse biomass upgrading processes or for liquid fuel uses. See S. G. Wettstein, J. Q. Bond, D. M. Alonso, H. N. Pham, A. K. Datye and J. A. Dumesic, *Appl. Catal.*, B, 2012, 117-118, 321-329; E. I. Gürbüz, J. M. R. Gallo, D. M. Alonso, S. G. Wettstein, W. Y. Lim and J. A. Dumesic, *Angew. Chem., Int. Ed.*, 2013, 52, 1270-1274; J. S. Luterbacher, J. M. Rand, D. M. Alonso, J. Han, J. T. Youngquist, C. T. Maravelias, B. F. Pfleger and J. A. Dumesic, *Science*, 2014, 343, 277-280; D. M. Alonso, S. G. Wettstein and J. A. Dumesic, *Green Chem.*, 2013, 15, 584-595; J. Q. Bond, D. M. Alonso, D. Wang, R. M. West and J. A. Dumesic, *Science*, 2010, 327, 1110-1114; D. J. Braden, C. A. Henao, J. Heltzel, C. C. Maravelias and J. A. Dumesic, *Green Chem.*, 2011, 13, 1755-176; and J. C. Serrano-Ruiz, D. Wang and J. A. Dumesic, *Green Chem.*, 2010, 12, 574-577.

Recent decreases in liquid fuel prices and increases in demands of polymers and organic dyes have attracted interest in the production of high-value chemicals. Making such value-added chemicals requires high-purity reagents, with tightly controlled functional groups in their molecular structure. For instance, organic dyes possess colorizing chemical features, called chromophores, such as aromatic (quinone dye) or ketone (C=O) functional groups to absorb the light in the visible and ultraviolet (UV) range. Similarly, functional polymers utilize specific chemical functionalities, such as furan, α-ω diols, or dicarboxyl acids, to improve control over various polymer properties, such as thermal resistance, mechanical strength, and gas permeability. Aldol-condensation is a chemical reaction that can append additional functional groups to a target molecule. Therefore, aldol-condensed chemicals can be used as new platform chemicals for applications in high-value chemicals by providing versatile functional groups. See G. W. Huber, J. N. Chheda, C. J. Barrett and J. A. Dumesic, *Science*, 2005, 308, 1446-1450 and H. Chang, A. H. Motagamwala, G. W. Huber and J. A. Dumesic, *Green Chem.*, 2019, 21, 5532-5540.

Polyurethanes are used in a wide range of applications including insulators, foams, paints, coatings, elastomers, inks, and integral skins. The urethane bonds in polyurethanes are synthesized by the reaction of diols with diisocyanates. The most common diols are ethylene glycol, 1,4-butanediol, and 1,6 hexanediol. The thermal and physical properties of polyurethanes can be modified by the use of different types of diisocyanates. The molar ratio of the monomers influence the polymer properties and the degree of crosslinking. Generally, flexible long segments of polyols produce soft viscoelastic polymers, whereas stiff polymers are synthesized by a higher degree of crosslinking. Thus, stretchy polymers are obtained through long chains with low crosslinking, while hard polymers are yielded from shorter chains with high degree of crosslinking. A combination of long chains with average degree of crosslinking produces foam shapes of polymers. Polyesters are also used in a wide range of applications including packaging, adhesives, and biomedical applications. See, for example, J. O. Akindoyo, M. D. H. Beg, S. Ghazali, M. R. Islam, N. Jeyaratnam, A. R. Yuvaraj, Polyurethane types, synthesis and applications—a review. *RSC Adv.* 6 (2016), pp. 114453-114482.

Polyesters are produced by ring-opening reactions or esterification of a diol with a dicarboxylic acid. Similarly, the properties of the polyester can be tuned by changing the type and ratio of dicarboxylic acid and the diols used. See, for example, A. M. Diciccio, G. W. Coates, Ring-opening copolymerization of maleic anhydride with epoxides: A chain-growth approach to unsaturated polyesters. *J. Am. Chem. Soc.* 133, 10724-10727 (2011) and N. A. Peppas, J. Klier, Controlled release by using poly(methacrylic acid-g-ethylene glycol) hydrogels. *J. Control. Release.* 16, 203-214 (1991).

The industrial polyols used today are almost exclusively derived from petroleum. Environmental concerns have led research towards sustainable and eco-friendly substitutes from natural resources. Several studies have produced polymers from biomass-derived feedstocks. Polyols, derived from vegetable oils, were used to produce polyurethanes. However, production of polyols from vegetable oils is expensive, requiring multiple reaction steps, including epoxidation, hydroformylation, ozonolysis, transetherification, amination, and tiol-ene couplings. See P. Alagi, Y. J. Choi, S. C. Hong, Preparation of vegetable oil-based polyols with controlled hydroxyl functionalities for thermoplastic polyurethane. *Eur. Polym. J.* 78, 46-60 (2016). 5-hydroxymethyl furfural (HMF) is a biomass-derived platform chemical that can be effectively synthesized from corn starch. HMF can be used to produce furan dicarboxylic acid (FDCA) which is then reacted with ethylene glycol to create polyethylene 2,5-furandicarboxylate (PEF). This technology is being commercialized by Avantium and AVA Biochem as a polyester with improved barrier properties. See L. Sun, J. Wang, S. Mahmud, Y. Jiang, J. Zhu, X. Liu, New insight into the mechanism for the excellent gas properties of poly (ethylene 2,5-furandicarboxylate) (PEF): Role of furan ring's polarity. *Eur. Polym. J.* 118, 642-650 (2019). A HMF-derived diol was synthesized by acetalization with pentaerythriol and used as a diol resource for production of poly(urethane-urea)s and polyesters. N. Warlin, M. N. Garcia Gonzalez, S. Mankar, N. G. Valsange, M. Sayed, S. H. Pyo, N. Rehnberg, S. Lundmark, R. Hatti-Kaul, P. Jannasch, B. Zhang, A rigid spirocyclic diol from fructose-based 5-hydroxymethylfurfural: Synthesis, life-cycle assessment, and polymerization for renewable polyesters and poly(urethane-urea)s. *Green Chem.* 21, 6667-6684 (2019). Unfortunately, HMF-derived diols can be chemically unstable due to the furanic functionality which leads to uncontrollable ring-opening and/or condensation reactions when the composition of biomass-derived monomers is high in the feed. See S. K. R. Patil, C. R. F. Lund, Formation and growth of humins via aldol addition and condensation during acid-catalyzed conversion of 5-hydroxymethylfurfural. *Energy and Fuels.* 25, 4745-4755 (2011). Kraft lignin has also been used to synthesize polyurethanes or to blend with polyesters. Y. Li, S. Sarkanen, Alkylated kraft lignin-based thermoplastic blends with aliphatic polyesters. *Macromolecules.* 35, 9707-9715 (2002). However, the lignin and polyurethane network becomes brittle when the lignin content is above 30-35%. Y.-Y. Wang, C. E. Wyman, C. M. Cai, A. J. Ragauskas, Lignin-Based Polyurethanes from Unmodified Kraft Lignin Fractionated by Sequential Precipitation. *ACS Appl. Polym. Mater.* 1, 1672-1679 (2019). Therefore, the use of chemically stable petroleum-based aliphatic diols, such as ethylene glycol, 1,4-butanediol, and 1,6-hexandiol, is necessary to utilize the biomass-derived polyols in polymer synthesis. Accordingly, the composition of biomass-based polyols in polymers has been limited to achieve advantaged polymeric properties. Past research in using biomass-derived monomers for polymer synthesis has identified several challenges including: 1) the high cost to produce biomass-based monomers, 2) the use of additional petrochemicals for polymer synthesis and 3) the lack of the polymer fitting into the current infrastructure.

However, there remain long-felt and unmet challenges to develop a process to produce a versatile platform chemical from biomass that satisfies the quality criteria demanded by commercial purchasers of high-value chemicals (e.g., monomers, polymers, organic dyes, etc.). Firstly, the method must yield the platform chemical in high purity, with minimal post-synthesis purification processing required. Extensive post-synthetic separation and/or purification steps contribute to higher capital and operating costs, which in turn will price the platform chemical out of the market. Secondly, the platform chemical itself must be acceptably shelf-stable and reasonably resistant to uncontrolled side-reactions, while also being amenable to participating in the desired reactions. An unstable platform chemical leads to added costs, such as refrigerated transportation and storage to minimize product degradation prior to the point of sale. Lastly, hazardous solvents and noble metal catalysts that are typically used in biomass conversion need to be replaced by green solvents and inexpensive catalysts.

These long-felt and unmet needs have largely confined biomass applications to the liquid fuel industries, where the market will accept chemical mixtures as the final product. Because fuels are simply combusted for their energy content, the chemical stability of fuels is not of critical importance.

SUMMARY

Disclosed herein is a method to produce a new platform chemical (an aldol-condensed product, generically designated herein as HAH) from fructose. The HAH compounds are useful as a platform chemical for organic dyes and monomers. The proposed reaction route is described in Scheme 1. In a representative reaction, a high concentration (9.1 wt %) of fructose was dehydrated in acetone/water (75/25, v/v) solvent with HCl catalyst (60 mM) to produce a high yield (85.9%) of HMF. Then, the acetone solvent was evaporated under low temperature (~293 K) and pressure (~50 mbar) to minimize HMF degradation and to prepare the appropriate molar ratio of HMF and acetone for aldol-condensation. The distilled solution, comprising HMF, acetone, HCl, and by-products, served as a feed for the aldol-condensation reaction without purifying the HMF. A controlled amount of NaOH was used to neutralize HCl remaining from the dehydration step, and to catalyze the aldol-condensation. The initial molar ratio of the fructose-derived HMF and acetone determined the yield of the HAH product (which under these conditions gave a maximum yield of 83.6%). The difference in water solubility between the HAH product and impurities allowed for simple purification of the HAH product by washing with water. $^1$H NMR and $^{13}$C qNMR spectra were used to characterize the HAH molecule (di(5-hydroxymethylfuran-2-ethyl) ketone), and the purity of the HAH product was measured to be >99% by HPLC analysis. The functional groups, such as diols and enones, in HAH were selectively converted by etherification, dimerization, and reduction reactions to demonstrate applications in organic dye and polymer industries. Furthermore, a techno-economic analysis (TEA) assessed the economic viability of the process. The minimum selling price (MSP) of HAH product was calculated to be $1,958 per ton (2021, USD). At that price, HAH is price competitive with anthraquinone ($3,200-$3,900 per ton) and bisphenol-A ($1,360-$1,720 per ton). The method thus provides a new approach that uses a sustainable feedstock (fructose) to make a platform chemical that can be used in various high-value chemicals markets.

The overall reaction to make HAH is shown in Scheme 1:

SCHEME 1.

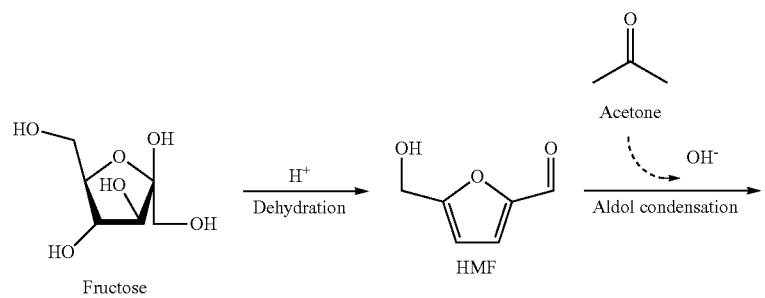

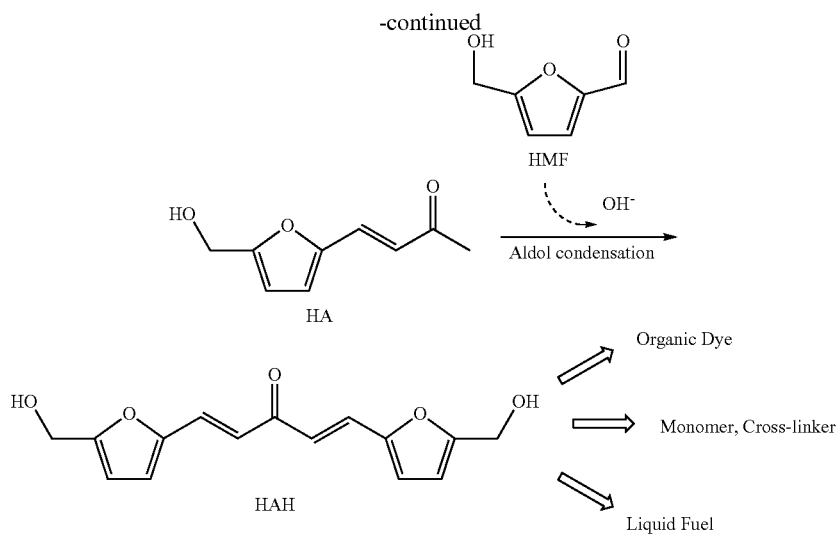

Overall catalytic reaction route for HAH production from fructose by dehydration and aldol-condensation.

Thus, disclosed herein is a method of making biomass-derived polymers, notably polyesters and polyurethanes. The method comprises reacting a first polyol with a diisocyanate or a dicarboxylic acid co-monomer, for a suitable time and temperature, to yield a polymer. The first polyol is biomass-derived and comprises a Formula I compound selected from the group consisting of Formula I:

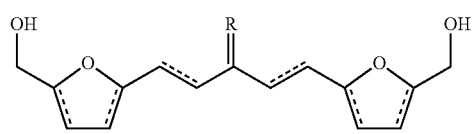

wherein dashed bonds are single or double bonds and R is selected from =O or —OH.

In all versions of the method, the diisocyanate and dicarboxylic acid co-monomers may be any diisocyanate and dicarboxylic acid, of any description, without limitation. Preferred (but not required) diisocyanates include methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane. Preferred (but not required) dicarboxylic acids include oxalic, malonic, succinic, glutaric, adipic, picric, phthalic, isophthalic, terephthalic, biphenyl-2,2'-dicarboxylic, and 2,6-naphthalenedicarboxylic acid acids.

In one version of the method, prior to reacting the first polyol with the diisocyanate or dicarboxylic acid, the first polyol is blended with a second polyol that is structurally distinct from the first polyol. The second polyol may be any polyol, without limitation, so long as it is structurally distinct from the first polyol. Preferred (but not required) polyols include linear or branched alkylene glycols, sugar alcohols, polyether polyols, polyester polyols, polycarbonate polyols, polycaprolactone polyols, polybutadiene polyol, and polysulfide polyols.

In another version of the method, the first polyol comprises:

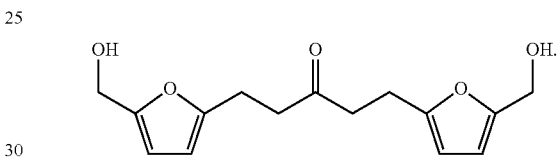

Again, in this version, the diisocyanate and dicarboxylic acid co-monomers may be any diisocyanate and dicarboxylic acid, of any description, without limitation. Also, the first polyol may be blended with a second polyol that is structurally distinct from the first polyol, prior to polymerization. This version of the method may optionally comprise, prior to reacting the first polyol with the diisocyanate or dicarboxylic acid, reacting the first polyol with a maleimide, and/or N-substituted maleimides.

In yet another version of the method, wherein the first polyol comprises:

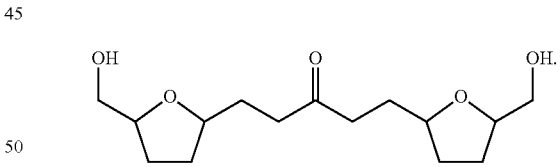

In a still further version of the method, the first polyol comprises:

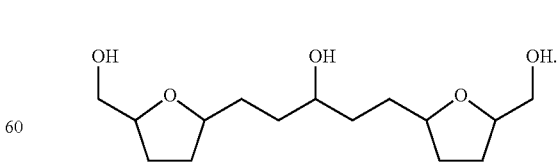

Also disclosed herein is a polymer comprising a first co-monomer comprising a diisocyanate or a dicarboxylic acid; and a second co-monomer which, prior to polymerization, comprises a compound of Formula I:

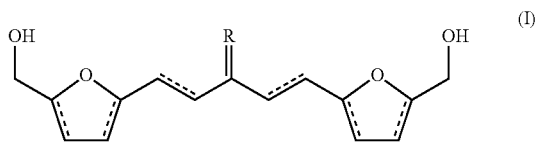

(I)

wherein dashed bonds are single or double bonds and R is selected from =O or —OH.

Also disclosed herein are polymers made by any of the methods disclosed.

DETAILED DESCRIPTION

Abbreviations and Definitions

Figure 1A:
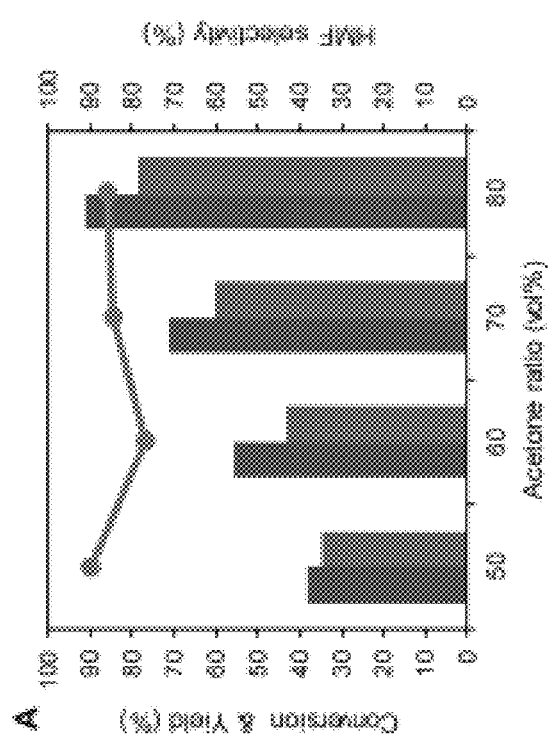
FIG. 1A is a histogram showing fructose conversion (blue bar), HMF yield (red bar), and HMF selectivity (green dot) as a function of acetone ratio in the solvent (reaction conditions: 0.6 g fructose (~420 mM) in 8 mL acetone/water solvent at 393 K over 0.2 g Amberlyst-15 catalyst)

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. That is, unless specifically stated to the contrary, "a" and "an" mean "one or more." The phrase "one or more" is readily understood by one of skill in the art, particularly when read in context of its usage. For example, "one or more" substituents on a phenyl ring designates one to five substituents.

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the method described herein, as well as any additional or optional ingredients, components, or limitations described herein or otherwise useful in synthetic organic chemistry.

The term "contacting" refers to the act of touching, making contact, or of bringing to immediate or close proximity, including at the molecular level, for example, to bring about a chemical reaction, or a physical change, e.g., in a solution or in a reaction mixture.

Dicarboxylic acids conventionally used to make polyesters are well known and will not be described in any detail herein. Suitable dicarboxylic acids include (but are not limited to oxalic, malonic, succinic, glutaric, adipic, and picric acids, and the like. Conventional aromatic dicarboxylic acids include, for example, phthalic acid, isophthalic acid, terephthalic acid diphenic acid, 2,6-naphthalenedicarboxylic acid, and the like.

An "effective amount" refers to an amount of a chemical or reagent effective to facilitate a chemical reaction between two or more reaction components, and/or to bring about a recited effect. Thus, an "effective amount" generally means an amount that provides the desired effect.

The term "solvent" refers to any liquid that can dissolve a compound to form a solution. Solvents include water and various organic solvents, such as hydrocarbon solvents, for example, alkanes and aryl solvents, as well as halo-alkane solvents. Examples include hexanes, benzene, toluene, xylenes, chloroform, methylene chloride, dichloroethane, and alcoholic solvents such as methanol, ethanol, propanol, isopropanol, and linear or branched (sec or tert) butanol, and the like. Aprotic solvents that can be used in the method include, but are not limited to perfluorohexane, α,α,α-trifluorotoluene, pentane, hexane, cyclohexane, methylcyclohexane, decalin, dioxane, carbon tetrachloride, freon-11, benzene, toluene, triethyl amine, carbon disulfide, diisopropyl ether, diethyl ether, t-butyl methyl ether (MTBE), chloroform, ethyl acetate, 1,2-dimethoxyethane (glyme), 2-methoxyethyl ether (diglyme), tetrahydrofuran (THF), methylene chloride, pyridine, 2-butanone (MEK), acetone, hexamethylphosphoramide, N-methylpyrrolidinone (NMP), nitromethane, dimethylformamide (DMF), acetonitrile, sulfolane, dimethyl sulfoxide (DMSO), propylene carbonate, and the like.

The aldol reaction is a well-known reaction in which an enol or an enolate ion reacts with a carbonyl compound to form a β-hydroxyaldehyde or a β-hydroxyketone. The β-hydroxyaldehyde or a β-hydroxyketone can then be dehydrated to give a conjugated enone. Colloquially, the first step is often called an "aldol reaction," while the two-step reaction to yield the conjugated enone is referred to as an "aldol condensation." The Diels-Alder reaction is another well-known reaction between a conjugated diene and a substituted alkene to yield a substituted cyclohexene derivative. The aldol condensation and Diels-Alder reactions are well known to chemists of ordinary skill in the art and will not be described in any detail herein.

HPLC=High Performance Liquid Chromatography. MSP—minimum selling price. PDA=photodiode array. PTFE=poly(tetrafluoroethylene).

HA=5-(hydroxymethyl)-furan-2-butenone:

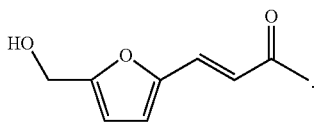

HAH=di-((5-hydroxymethyl)furan-2-ethenyl)ketone:

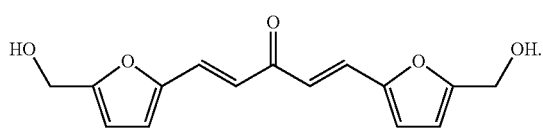 [SMILES: O=C(/C=C/c1ccc(CO)o1)/C=C/c1ccc(CO)o1]

PHAH=Partially-Hydrogenated HAH:

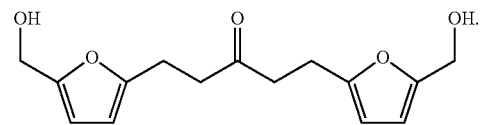 [SMILES: O=C(CCc1ccc(CO)o1)CCc1ccc(CO)o1]

FHAH=fully-hydrogenated HAH:

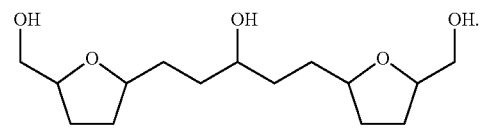 [SMILES: OCC1CCC(CCC(O)CCC2CCC(CO)O2)O1]

HMF=5-hydroxymethylfurfural (IUPAC name 5-(hydroxymethyl)-furan-2-carbaldehyde):

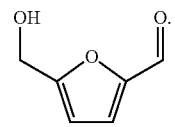

"Maleimide" refers to compounds having the structure:

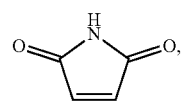

and N-substituted analogs thereof.

Metallic catalysts: The term is defined broadly herein to include any and all metal-containing, catalytically active materials. It is preferred for economic reasons, but not required, that the metal catalysts used do not comprise noble metals (defined as ruthenium (Ru), rhodium (Rh), palladium (Pd), copper (Cu), nickel (Ni), platinum (Pt), and gold (Au)). "Metallic catalysts" as defined herein are dimensioned, configured, and catalytically active to catalyze partial or complete hydrogenation of HAH in the presence of molecular hydrogen. "Metallic catalysts" may also be dimensioned and configured to catalyze the formation of urethane bonds between polyol and isocyanate reactants. Non-exclusive examples of metallic catalysts include refractory oxides such as alumina, particularly alpha alumina, zirconia, titania, hafnia, silica; or mixtures thereof. The metallic catalyst may optionally be disposed on a support, such as rare earth-modified refractory metal oxides, where the rare earth may be any rare earth metal, for example, lanthanum or yttrium; and/or alkali earth metal-modified refractory oxides. The catalyst support material can be categorized as materials having a substantially stable surface area at reaction conditions, for example, a surface area that is not substantially altered by reaction conditions or altered in a way that affects the reaction. Explicitly included within the definition are mixed catalysts comprising tungsten oxide(s)/hydroxides and zirconia, e.g., tungstated zirconium hydroxide: $WO_x$—$ZrO_2$. Other catalysts include, but are not limited to, zeolites, metal oxides supported or unsupported such as MgO, $ZrO_2$, gamma-$Al_2O_3$, $CeO_2$, $CeZrO_x$, $MgOAl_2O_3$, $Mg/Al/ZrO_x$, $MgO/SiO_2$, $CeO_2ZnO$, Sn-beta-zeolite, Ti-beta-zeolite, Sncontaining mesoporous silica, as well as metal salts and complexes of Ir, Rh, Fe, Ni, Co, Os, Mo. Exemplary catalysts for catalyzing the production of polyurethane include Ru/C, Pd/Al$_2$O$_3$, Ni/SiO$_2$, Cu/Al$_2$O$_3$, and the like.

A "polyol" is any compound having two or more hydroxyl (—OH) groups. Exemplary polyols include linear or branched alkylene glycol, sugar alcohol, polyether polyol, polyester polyol, polycarbonate polyol, polycaprolactone polyol, polybutadiene polyol, and polysulfide polyols. Specific non-limiting polyols include ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, trimethylolpropane, pentaerythritol, maltitol, sorbitol, xylitol, erythritol, isomalt, polyethylene glycol (PEG), polypropylene glycol (PPG), polyvinyl alcohol, poly(tetramethylene ether) glycols, etc.

Solid metallic catalysts can be in any shape or form now known or developed in the future, such as, but not limited to, granules, powder, beads, pills, pellets, flakes, cylinders, spheres, or other shapes.

A "solid acid catalyst" can comprise one or more solid acid materials. The solid acid catalyst can be used independently or alternatively can be utilized in combination with one or more mineral acid or other types of catalysts. Exemplary solid acid catalysts which can be utilized include, but are not limited to, heteropoly acids, acid resin-type catalysts, meso-porous silicas, acid clays, sulfated zirconia, molecular sieve materials, zeolites, and acidic material on a thermo-stable support. Where an acidic material is provided on a thermo-stable support, the thermo-stable support can include for example, one or more of silica, tin oxide, niobia, zirconia, titania, carbon, alpha-alumina, and the like. The oxides themselves (e.g., ZrO$_2$, SnO$_2$, TiO$_2$, etc.) which may optionally be doped with additional acid groups such as SO$_4$ may also be used as solid acid catalysts.

Further examples of solid acid catalysts include strongly acidic ion exchangers such as cross-linked polystyrene containing sulfonic acid groups. For example, the Amberlyst®-brand resins are functionalized styrene-divinylbenzene copolymers with different surface properties and porosities. The functional group is generally of the sulfonic acid type. The Amberlyst®-brand resins are supplied as gellular or macro-reticular spherical beads. (Amberlyst® is a registered trademark of the Dow Chemical Co.) Similarly, Nafion®-brand resins are sulfonated tetrafluoroethylene-based fluoropolymer-copolymers which are solid acid catalysts. Nafion® is a registered trademark of E.I. du Pont de Nemours & Co.)

"Strong acids" include HCl, HNO$_3$, H$_2$504, HBr, HF, HI, HClO$_4$, and HClO$_3$.

Experimental Methods

Materials: Fructose (>99%, Sigma-Aldrich), acetone (HPLC grade, Fisher Scientific, Waltham, Mass.), methanol (HPLC grade, Fisher Scientific), NaOH (FCC specification, Fisher Scientific), HCl (6 N, Fisher Scientific), activated carbon (Norit SX-Ultra, Cabot Corporation, Billerica, Mass.), HMF (98% AK Scientific, Union City, Calif.), acetone (Fisher, HPLC grade), 4,4'-methylenebis(phenyl isocyanate) ("MDI", Sigma-Aldrich, 98%), maleimide (99%, Sigma-Aldrich), bismaleimide (95%, Sigma-Aldrich), succinic acid (99%, Sigma-Aldrich), dibutyltin (N) oxide (98%, Sigma-Aldrich), dimethyl sulfoxide (DMSO, Sigma-Aldrich, anhydrous, 299.9%), 4-methyl-2-pentanone ("MIBK," Sigma-Aldrich, HPLC grade), 2-propanol ("IPA," HPLC-grade, Sigma-Aldrich), tetrahydrofuran (THF, Sigma-Aldrich), gamma alumina (Strem Chemicals), tetraaminecopper(II) sulfate ([Cu(NH$_3$)$_4$]SO$_4$·$_x$H$_2$O, Strem Chemicals) and Mill-Q water (~18 MO cm) were used in all the examples. Commercial tungstated zirconium hydroxide (15 wt % WO$_3$ loading, MEL Chemicals, XZ01251/01, Flemington, N.J.), sodium borohydride (Sigma-Aldrich, St. Louis, Mo., purum p.a. >96%), sodium acetate (Sigma-Aldrich), ethyl acetate (HPLC grade, Fisher Chemical), hexane (HPLC grade, Sigma-Aldrich), etherification and hydrogenation reactions were performed in a 50 mL Parr reactor (Parr Instrument Company, Moline, Ill.).

Decolorization of the dehydrated solution on activated carbon: Activated carbon was received from Cabot Corporation and used as received. The humins from fructose dehydration were selectively adsorbed on activated carbon at 298 K. In a milligram scale experiment, 0.35 g activated carbon was added to 7.4 g dehydrated solution and stirred for 30 min. After the adsorption, activated carbon was filtrated through 0.2 μm PTFE filter. In a gram-scale experiment, 13.4 g water was added to 57 g dehydrated solution to dilute HCl concentration before activated carbon adsorption. Then, 1 g activated carbon was added to 70.4 g diluted solution and stirred for 30 min. After the adsorption, activated carbon was removed by filtration of the solution through filter paper (Grade 50 filter, Whatman, Global Life Sciences Solutions, Sheffield, UK). 0.1 mL of the filtered solution was diluted 10 times with Milli-Q water and analyzed using HPLC (Aminex HPX-87H column, Bio-Rad, Hercules, Calif.) to measure the concentrations of fructose, HMF, sugar isomers, and acidic by-products (formic acid, levulinic acid). 0.1 mL of the filtered solution was diluted 5 times with methanol and analyzed using HPLC (Luna C18 column, Phenomenex, Torrance, Calif.) to measure the concentration of HA.

Vacuum distillation of dehydrated and decolorized product: The decolorized solution was distilled under ~100 mbar in the air (~298 K). Acetone was evaporated before water under ~100 mbar while the temperature of the solution decreased from 298 K to 290 K during acetone evaporation. After acetone evaporation, the pressure was further decreased from ~100 to ~50 mbar to evaporate water. During the water evaporation in the air, the temperature of the solution was around 290-293 K. The density of decolorized solution increased from 0.922 g mL$^{-1}$ to 1.027 g mL$^{-1}$. The density of the solution was always more than 1.02 g mL$^{-1}$ when $$\frac{HMF}{Acetone + HA}(mol) > 2.$$

HPLC analysis of dehydrated, decolorized, and distilled solution: The chemical composition of the dehydrated, decolorized, and distilled solution was quantified by High Performance Liquid Chromatography (HPLC) analysis. 0.1 mL of dehydrated or decolorized solution was diluted 10 times with Milli-Q water for analyzing the concentration of fructose, HMF, sugar isomers, and acidic by-products (formic acid, levulinic acid). Similarly, 0.1 mL of dehydrated or decolorized solution was diluted 5 times with methanol for analyzing the concentrations of HMF and HA. 0.04 mL of distilled solution was diluted 20 times with Milli-Q water for analyzing the concentrations of acetone, sugars, HMF, and acidic by-products. Similarly, 0.04 mL of distilled solution was diluted 10 times with methanol for analyzing the concentrations of HMF and HA. All the diluted samples were filtrated through 0.2 μm PTFE filter before the sample was injected into HPLC. The concentrations of fructose, sugar isomers, and acidic by-products were measured by a Water 2695 separation module equipped with a Aminex HPX-87H (Bio-Rad) column and RI detector, while HMF concentration was measured with a Waters 2998 PDA detector at 320 nm (Waters Corporation, Milford, Mass.). The temperature of the HPLC column was maintained at 338 K, and the flow rate of the mobile phase (pH 2 water, acidified by sulfuric acid) was 0.6 mL min$^{-1}$. The concentration of HA was measured by a Waters 2695 separation module equipped with a Luna C18 (Phenomenex) column and a Waters 2998 PDA detector set at 390 nm (for HA analysis). The temperature of the HPLC column was held constant at 323 K. The mobile phase was a gradient of methanol/water (with 0.1 wt % formic acid) at a constant flow rate of 1.0 mL min–$^{1}$ (0.1 wt % formic acid water linearly changed to methanol in 20 min, held pure methanol for 7 min, and methanol linearly changed to 0.1 wt % formic acid water in 3 min).

$$\text{HMF yield from fructose} = \frac{\text{Moles of final } HMF}{\text{Moles of initial fructose}} \times 100(\%) \quad (1)$$

$$\text{Fructose conversion} = \frac{\text{Moles of initial fructose} - \text{Moles of final fructose}}{\text{Moles of initial fructose}} \times 100(\%) \quad (2)$$

HPLC analysis of aldol-condensed solution: After aldol-condensation, residual HMF and aldol-condensed products (HA, HAH) were quantified by HPLC analysis. The as-synthesized solution was neutralized with HCl (pH of the solution was measured by pH test strips) and diluted 4 times with methanol to terminate aldol-condensation and dissolve precipitated HAH. 0.1 mL of diluted solution was further diluted 10 times with methanol for analyzing the concentrations of HMF and HA. Similarly, 0.01 mL diluted solution was diluted 500 times with methanol for analyzing the concentration of HAH to avoid the signal saturation of the PDA detector. The diluted samples were filtrated through 0.2 μm PTFE filter before the sample was injected into HPLC. The concentrations of HMF, HA, and HAH were measured by a Waters 2695 separation module equipped with a Luna C18 (Phenomenex) column and a Waters 2998 PDA detector, set at 320 nm (for HMF analysis) and 390 nm (for HA, HAH analysis). The temperature of the HPLC column and mobile phase were same as described above. Purified chemical standards of HA and HAH were used for the calibration of concentration and integrated peak area.

$$\text{HA yield from } HMF = \frac{\text{Moles of final } HA}{\text{Moles of initial } HMF} \times 100(\%) \quad (3)$$

$$\text{HAH yield from } HMF = \frac{2 \times \text{Moles of final } HAH}{\text{Moles of initial } HMF} \times 100(\%) \quad (4)$$

$$\text{HMF conversion} = \frac{\text{Moles of initial } HMF - \text{Moles of final } HMF}{\text{Moles of initial } HMF} \times 100(\%) \quad (5)$$

Fructose dehydration with HCl in acetone/water (75/25, v/v) solvent: In a milligram-scale experiment, aqueous feed (25 wt % fructose) was prepared by dissolving 5 g fructose and 1.26 mL of 3 M HCl solution in 13.74 mL Milli-Q water. 2.69 g aqueous feed (0.67 g fructose, 2 mL water, 0.02 g HCl) was mixed with 6 mL acetone in a 10 mL thick-walled glass reactor (Chemglass). A triangular stir bar was added for stirring at 700 rpm. The reactor was placed in an oil bath at 393 K for 75 min. In a gram scale experiment, 4 g fructose and 1.16 g of 3 M HCl were dissolved in 11 g Milli-Q water to prepare the aqueous feed. Then, 35.63 mL acetone was mixed with the aqueous feed in a 48 mL thick-walled glass reactor (Ace glass). An egg-tshaped stir bar was added for stirring at 900 rpm. The reactor was placed in an oil bath at 393 K for 95 min. The dehydration was terminated by cooling the reactor in a water bath.

Fructose dehydration with HCl in acetone/water (50/50, v/v) solvent: The aqueous feed (30 wt % fructose in water) was prepared by dissolving 6.5 g fructose and 0.75 mL 6 M HCl solution in 14.25 mL Milli-Q water. 5.07 g aqueous feed (1.53 g fructose, 3.5 mL water, 0.04 g HCl) was mixed with 3.5 mL acetone in a 10 mL thick-walled glass reactor (Chemglass Life Sciences, Vineland, N.J.). A triangular stir bar was added for stirring at 790 rpm. Each reactor was placed in an oil bath at 393 K for different reaction times. The dehydration was terminated by cooling the reactor in a water bath. 0.5 mL dehydrated sample was diluted 10 times with Milli-Q water and analyzed using HPLC (Aminex HPX-87H column, Bio-Rad) to measure the concentration of fructose, HMF, sugar isomers, and acidic by-products. The HPLC sample was filtrated with 0.2 μm PTFE filter before the sample injection into HPLC.

Fructose dehydration in different ratios of acetone/water solvent over Amberlyst-15: For acetone/water (50/50, v/v) solvent experiments, 0.6 g fructose was dissolved in the mixture of 4 mL Milli-Q water and 4 mL acetone. For acetone/water (60/40, v/v) solvent experiments, 0.6 g fructose was dissolved in the mixture of 3.2 mL Milli-Q water and 4.8 mL acetone. For acetone/water (70/30, v/v) solvent experiments, 0.6 g fructose was dissolved in the mixture of 2.4 mL Milli-Q water and 5.6 mL acetone. For acetone/water (80/20, v/v) solvent experiments, 0.54 g fructose was dissolved in the mixture of 1.6 mL Milli-Q water and 6.4 mL acetone (Table 1). 0.2 g Amberlyst-15 catalyst was added to the fructose feed and the reactor was placed in an oil bath at 393 K. A triangular stir bar was used for stirring at 650 rpm. 150 min reaction time was used for the experiments of 50/50, 60/40, and 70/30 acetone/water solvents. 90 min reaction time was used for 80/20 acetone/water solvent experiment since the fructose conversion had reached near the complete conversion. 10 mL thick-walled glass reactors (Chemglass) were used for the experiments. The dehydrated solution was decolorized on 0.06 g activated carbon for 30 min before HPLC analysis. 0.5 mL decolorized sample was diluted 10 times with Milli-Q water and filtrated with 0.2 μm PTFE filter before the sample injection into HPLC.

TABLE 1

Fructose dehydration in different acetone/water solvents

| Solvent volume composition (acetone/water) | Fructose added (g) | Amberlyst-15 added (g) | Milli-Q water added (mL) | Acetone added (mL) | Reaction time (min) |
|---|---|---|---|---|---|
| 50/50 | 0.60 | 0.20 | 4.0 | 4.0 | 150 |
| 60/40 | 0.60 | 0.20 | 3.2 | 4.8 | 150 |
| 70/30 | 0.60 | 0.20 | 2.4 | 5.6 | 150 |
| 80/20 | 0.54 | 0.20 | 1.6 | 6.4 | 90 |

HPLC analysis of Diels-Alder reactions: The chemical concentrations of maleimide and bismaleimide were quantified by high performance liquid chromatography (HPLC) analysis. The maleimide containing solutions were diluted by 10 times with Milli-Q water and the bismaleimide containing solutions were diluted by 5 times in acetone. All the diluted solutions were filtered through 0.2 μm PTFE filter before the sample was injected into the HPLC. The concentrations of bismaleimide were measured by a Waters 2695 separations module equipped with a Luna C18 (Phenomenex, Part No. 00G-4041-E0) HPLC column and a Waters 2998 PDA detector, set at 320 nm. The temperature of the HPLC column was maintained at 50° C. The mobile phase was a gradient methanol/water (with 0.1 wt % formic acid) at a constant flow rate of 1.0 mL min$^{-1}$ (0.1 wt % formic acid water linearly changed to methanol in 20 min, pure methanol for 7 min, and methanol was linearly changed to 0.1% formic acid water in 3 min). The concentrations of maleimide were measured by a Water 2695 separation module equipped with an Aminex HPX-87H (Bio-Rad) column and RI detector. The temperature of the HPLC column was maintained at 50° C., and the flow rate of the mobile phase (pH 2 water, acidified by sulfuric acid) was 0.6 mL min$^{-1}$.

GC-FID analysis of PHAH and FHAHL: Partially-hydrogenated HAH (PHAH) and fully-hydrogenated HAH (FHAH) were quantified by gas chromatograph (Shinadzu GC-2010) equipped with a flame-ionization detector (GC-FID) and a Zebron ZB-50 column (Phenomenex, Part No. 7HG-G004-11). The hydrogenated HAH solutions (without dilution) were filtered with 0.2 μm PTFE membrane syringe filter before GC analysis. Analytical standards of PHAH and FHAH were synthesized and GC was calibrated with these analytical standards.

NMR analysis of biomass-derived monomers and polymers: $^1$H nuclear magnetic resonance (NMR) and $^{13}$C NMR spectrum were obtained by using Brucker Avance-500 spectrometer. Tetramethylsilane (TMS) (δ: 0 ppm) was used as a reference for chemical shifts in $^1$H NMR spectrums and absolute reference was used for HSQC and $^{13}$C NMR spectrum.

GPC analysis of polymers: Gel permeation chromatography (GPC) analysis was performed by using a Viscotek GPCmax/VE 2001 instrument fitted with PolyPore columns (2×300×7.5 mm) featuring 5 μm particle size from Polymer Laboratories. Liquid solution, containing the dissolved polymers in THF (<1 mg mL$^{-1}$), was eluted with THF at a flow rate of 1 mL·min$^{-1}$ at 40° C. The molecular weights of the dissolved polymers were characterized by UV (at 390 nm wavelength for HAH-MDI and HAH-SA, at 320 nm for other polyurethanes) detection using a Viscotek Model 302-050 Tetra Detector Array. Omnisec software (Viscotek, Inc.) was used for data processing such as positioning the baseline, setting limits, and applying the molecular weight calibration (polystyrene was used to calibrate GPC).

DSC analysis of polymers: Differential scanning calorimetry (DSC) measurements (TA Instruments Q100 modulated differential scanning calorimeter, New Castle, Del.) was used for investigating the phase transition of polyurethanes with a heating and cooling rate of 10° C. min$^{-1}$. 5 mg of polyurethanes were placed in the standard aluminum pan (TA instrument) and sealed by the standard aluminum lid (TA instrument) to prepare DSC samples. Empty standard aluminum pan and lid were sealed and used as a reference. The heating and cooling cycles were repeated 3 times between 30 to 250° C. (300° C. for HAH-MDI, 270° C. for EG-MDI, 200° C. for HAH-SA) under 50 mL min$^{-1}$ of N$_2$ gas flow. 2 min of isotherm was allowed at the end of the heating and cooling process. DSC data were analyzed by TA Universal Analysis software. The specific heat capacity was calculated from the DSC result by using the equation: Specific heat capacity $(C_p,\ J\ °C.^{-1}g^{-1})$=Heat flow (W g$^{-1}$)*60 (s min$^{-1}$)/Heating rate (10° C. min$^{-1}$)

TGA analysis of polymers: TA Instruments Q500 Thermogravimetric Analyzer (TGA) was used for measuring the thermal stabilities of polyurethanes. 6 to 11 mg of polyurethanes were put in a 10 mm platinum sample pan with stirrup (Instrument Specialists Inc.) and placed in the furnace. Ramp rate was set to 20° C. min$^{-1}$ from 25° C. (or 30° C.) to 800° C. (700° C. for EG-MDI) under 50 mL min$^{-1}$ of N$_2$ gas flow. TGA data were analyzed by TA Universal Analysis software.

DMA analysis of polymers: TA RSA III Dynamic Mechanical Analysis (DMA) was used to measure the storage modulus (E') and loss modulus (E") of the molded polymers (data not shown). Dynamic frequency sweep tests of the polymers were performed at a fixed force (0.03% of strain force for polyurethanes, 0.05% of strain force for polyester) from 0.01 to 20 Hz of strain rates. The temperature was maintained at 25° C. during the measurements. tan δ=E"/E'.

Preparation of Cu/γ-Al$_2$O$_3$ catalyst: A Cu/γ-Al$_2$O$_3$ catalyst was synthesized by ion exchange. Low soda gamma alumina (γ-Al$_2$O$_3$) was crushed and sieved to 80-150 mesh size and added to 150 mL of 18 MΩ Milli-Q water. The desired amount of tetraaminecopper (II) sulfate ([Cu(NH$_3$)$_4$] SO$_4$·$_x$H$_2$O) was dissolved in a separate solution of 200 mL Milli-Q water and 0.5 M ammonium hydroxide solution. The copper solution was added to the gamma alumina slurry and the pH was adjusted to 9 with 2 M sulfuric acid. This slurry was covered and stirred for 20 h, filtered by vacuum filtration, and washed with excess Milli-Q water until the rinse water was neutral. The resulting catalyst was dried overnight in vacuum oven (500-600 mbar) at 50° C. The dried catalyst was treated under flowing Ar gas (Airgas) at 300° C. (5° C./min heating rate, 30 min hold) and then at 400° C. (5° C./min, 3 h hold) under flowing H$_2$ gas (Airgas). Before cooling, the catalyst was held under Ar gas for 1 h at 400° C. The catalyst was then cooled in Ar gas and passivated for 30 min in flowing 1% O$_2$ in Ar gas (Airgas).

Aldol-condensation of fructose-derived HMF and acetone: The concentrations of the distilled solution containing reactants (HMF, acetone, HA) and acidic by-products (formic acid, levulinic acid) were measured by HPLC analysis and this solution was used as a feed for aldol-condensation. The appropriate amount of acetone was added to the distilled solution for various initial "HMF/Acetone+HA" experiments (Table 2). Similarly, the appropriate amount of 3 M NaOH solution was determined based on previous kinetic model (H. Chang, A. H. Motagamwala, G. W. Huber and J. A. Dumesic, *Green Chem.*, 2019, 21, 5532-5540) and the amount required to neutralize the acids (HCl, formic acid, levulinic acid) in the distilled solution. The required amount of NaOH solution was added to the feed solution, containing a specific molar ratio of HMF and acetone sources (HMF/Acetone+HA), at room temperature and then the solution was placed in an oil bath at 308 K. The cross-shaped stir bar was used for stirring at 475 rpm. The reaction time was determined by the kinetic model to maximize the HAH yield. (H. Chang, et al. *Green Chem.*, 2019, 21, 5532-5540.) The product solution was neutralized with 0.5 M HCl solution and diluted with methanol for HPLC analysis.

TABLE 2

Feed conditions and reaction time for various initial molar ratio of HMF and acetone source

| HMF ——————(mol) Acetone + HA | Acetone added (g) | 3M NaOH solution added (mL) | HMF in distilled solution (g) | HA in distilled solution (g) | Acetone in distilled solution (g) | Reaction time (min) |
|---|---|---|---|---|---|---|
| 2.0 | 0.0100 | 0.400 | 0.310 | 0.010 | 0.030 | 70 |
| 2.2 | 0.0000 | 0.175 | 0.094 | 0.004 | 0.018 | 60 |
| 2.5 | 0.0075 | 0.173 | 0.096 | 0.004 | 0.016 | 60 |

Purification of HAH by water washing filtration: As-synthesized HAH from aldol-condensation of fructose derived HMF and acetone was purified by spontaneous crystallization in water. The aldol-condensed solution was neutralized by HCl before the purification. The neutralized solution was washed by passing water slowly during the paper filtration, leading to HAH precipitation and removal of water-soluble impurities (HMF, HA, salt, sugars). After collecting the washed HAH, the solid state of purified HAH was dried at 323-333 K overnight (>18 h) to remove residual water. The purity of the dried HAH was analyzed by HPLC and the molecular structures of HAH was characterized by $^1$H and $^{13}$C NMR spectrum (data not shown).

Preparation of HA chemical standard by column chromatography: 89 mg of commercial HMF was dissolved in a solution containing 0.5 ml acetone and 0.48 ml Milli-Q water in a 10 mL glass vial. A cross-shaped stir bar was added to the glass vial for mixing and the solution was heated to 308 K in an oil bath. The solution was kept at 308 K for 15 min before the addition of NaOH to reach thermal equilibrium. 0.135 ml of 1 M NaOH solution was injected to the HMF solution and the solution was stirred (800 rpm) at 308 K for 10 min. After the required time had elapsed, 1.11 ml of 0.1 M HCl solution was added to the product solution to terminate aldol-condensation. Column chromatography isolated HA and produced a standard chemical for HPLC quantification. Prior to chromatography, water solvent was evaporated at 313 K, under 50 mbar from the product mixture obtained after aldol-condensation. The concentrated product solution was separated by passing it through a silica gel column. Ethyl acetate/hexane mixture (50/50 (v/v)) was used as the eluent. Purified HA solution (light yellow liquid) was collected. Ethyl acetate and hexane were evaporated at 313 K under 200 mbar. The purity of HA was determined by $^1$H and $^{13}$C NMR spectrum (data not shown). The purified HA was used as the calibration standard for HPLC analysis.

Preparation of etherified HAH: 6 g commercial tungstated zirconium hydroxide was calcined at 923 K for 3 h in a muffle furnace. The temperature was raised from room temperature to 923 K with 5 K min-1 ramping rate. 31 mg calcined $WO_x$—$ZrO_2$ catalyst was placed in a 50 mL Parr reactor. 153 mg of HAH was completely dissolved in 10 mL methanol to prepare the feed. The HAH solution in methanol (56 mM) was added in the Parr reactor. The reactor was purged twice with 20 bar Ar to displace the air in the reactor. Then, 20 bar Ar was filled into the reactor for the etherification at room temperature. The Parr reactor was heated to 453 K in 1 h (final pressure increased to 55 bar at 453 K). The reactor was kept at 453 K for 9 h with 450 rpm stirring speed, and then cooled to room temperature by natural convection. The solid catalyst was separated from the etherified HAH by filtration. The methanol solvent was evaporated under 100 mbar at 313 K and the product was characterized by $^1$H NMR, $^{13}$C quantitative NMR, and high-resolution mass spectrometry (HRMS) (data not shown). The conversion and yield were measured by $^{13}$C quantitative NMR spectrum (data not shown).

Preparation of selectively reduced HAH: 137 mg HAH was dissolved in 10 mL methanol solvent to prepare the feed solution. 38 mg NaBH4 was added in the HAH solution with vigorous stirring for 2 h at arbitrary room temperature. 30 mL ethyl acetate and 10 mL saturated NaCl solution in water were added into the reduced HAH solution for the extraction. The organic phase was separated and evaporated under 150 mbar at 313 K and the product was characterized by $^1$H NMR, $^{13}$C quantitative NMR, and high-resolution mass spectrometry (HRMS) (data not shown). The conversion and yield were measured by $^{13}$C quantitative NMR spectrum.

Preparation of HAH dimer: 50 mg of HAH was mixed with 5 mL water and sonicated to produce colloidal dispersion. 60 mg of sodium acetate was added to the HAH colloidal solution. The colloidal HAH solution was vigorously stirred for 8 days at arbitrary room temperature. The dimerized product was precipitated by centrifugation (3000 rpm, 10 min) and the aqueous phase was gently separated by using pipette. The precipitated product was evaporated under 50 mbar at 313 K and the product was characterized by $^1$H NMR, $^{13}$C quantitative NMR, and high-resolution mass spectrometry (HRMS) (data not shown). The conversion and yield were measured by $^{13}$C quantitative NMR spectrum (data not shown).

UV-vis absorption spectrum of HAH, HAH dimer, and etherified HAH: HAH, HAH dimer, and etherified HAH were diluted in methanol solvent until the absorbance signals of the detector were not saturated. 12 mg of fructose-derived HAH was dissolved in 40 mL of methanol solvent to prepare the parent HAH solution (0.001 M) for molar excitation coefficient measurement. The parent HAH solution (0.001 M) was further diluted in methanol solvent to prepare 0.000054, 0.000027, 0.000014, and 0.000005 M HAH solution. All diluted samples were placed to absorption glass cell (Fisherbrand, Absorption Macro Special Optical Glass) and measured by UV-vis spectrophotometer (Beckman Coulter, DU-520, Beckman Coulter, a wholly owned subsidiary of Danaher Corporation, Brea, Calif.). Pure methanol solvent was scanned for background signal from 250 to 700 nm.

Alternative Production of HAH: 1.83 g of NaOH was dissolved in 15 g of Milli-Q water to prepare 3 M of NaOH solution to catalyze aldol-condensation and 2 mL of 37% HCl and 10 g of Milli-Q water were mixed to prepare 2 M of HCl solution to neutralize NaOH catalyst after aldol-condensation. 10.2 g of HMF, 3 mL of acetone, and 71.28 mL of Milli-Q water were mixed in 500 mL round bottom flask with magnetic stirring bar and placed in oil bath at 35° C. for 5 min. 6.67 mL of 3 M of NaOH solution was added to the HMF and acetone solution and the flask was capped with glass lid. After 1 h of aldol-condensation, ~7.74 mL of 2 M of HCl solution was added to the flask to terminate aldol-condensation by neutralization. A pH strip was used to measure the actual pH of the aldol-condensed solution. The aldol-condensed solution with the precipitated HAH was vacuum filtered by paper while rinsing with ~300 mL of Milli-Q water. The washed HAH was dried in a vacuum oven at 50° C., under 500-600 mbar for 2 days.

Partial hydrogenation of HAH: 100 mg of 3 wt % Cu/γ-$Al_2O_3$ catalyst was reduced at 300° C. for 5 h under 34 bar (at room temperature) of $H_2$ gas in a Parr reactor. HAH feed solution was prepared by dissolving 460 mg of HAH in 30 mL of IPA solvent. The HAH feed solution and a magnetic stirring bar were added into the 50 mL Parr reactor, containing the reduced Cu/γ-$Al_2O_3$ catalyst under Ar gas flow to avoid catalyst oxidation by air contact. The reactor was purged twice with 50 bar of Ar gas and three times with 30 bar of $H_2$ gas. The reactor was pressurized to 36 bar of $H_2$ gas at room temperature and was heated to 120° C. in 35 min (final pressure increased to 44 bar at 120° C.). The reactor was kept at 120° C. for 12 h and cooled to room temperature by natural convection. The partially-hydrogenated product was separated from the solid catalyst by syringe filter. Solvent was evaporated by rotary evaporation (40° C., 30-100 mbar) and the product was characterized by $^1H$ and $^{13}C$ NMR and was quantified by GC-FID.

Full hydrogenation of HAH: 460 mg of HAH was dissolved in 30 mL of IPA solvent. 60 mg of 5 wt % Ru/C catalyst and the HAH solution were added into a 50 mL Parr reactor with a magnetic stirring bar. The reactor was purged twice with 50 bar of Ar gas and three times with 30 bar of $H_2$ gas. The reactor was pressurized to 30 bar of $H_2$ gas at room temperature and was heated to 180° C. in 1 h (final pressure increased to 55 bar at 180° C.). The reactor was kept at 180° C. for 1 h and cooled to room temperature by natural convection. The fully-hydrogenated product was separated from the solid catalyst by a syringe filter. Solvent was evaporated by rotary evaporation (40° C., 30-100 mbar) and the product was characterized by $^1H$ and $^{13}C$ NMR and was quantified by GC-FID.

Diels-Alder reaction of maleimides and PHAH: 0.21 g of partially-hydrogenated HAH (PHAH, 0.74 mmol) and 0.21 g of maleimide (2.19 mmol) were dissolved in 4 mL of THF solvent to prepare a feed solution. A magnetic stirring bar was put into the feed solution and the solution was placed in oil bath at 50° C. for 93 h. 0.045 g (504) of solutions were diluted in 0.09 g (4504) of Milli-Q water to prepare the HPLC samples. 0.11 g of PHAH-MDI polyurethane (0.15 mmol of PHAH unit) and 0.016 g of bismaleimide (0.04 mmol) were mixed in 2 mL of THF solvent with a magnetic stirring bar and placed in an oil bath at 50° C. for 69 h. 0.20 g of HAH-PHAH-MDI polyurethane (0.31 mmol of PHAH unit, 0.09 mmol of HAH unit) and 0.055 g of bismaleimide (0.15 mmol) were mixed in 4 mL of THF solvent with a magnetic stirring bar and placed in an oil bath at 50° C. for 70 h. The polyurethanes were swollen by THF solvent. 0.088 g (1004) of solutions were diluted in 0.31 g (400 µL) of acetone for HPLC analysis of bismaleimide concentration. After the Diels-Alder reaction, THF solvent was evaporated by rotary evaporation (40° C., 30-200 mbar) and the solid sample was washed by ~30 g of Milli-Q water. The washed polyurethanes were dried in a vacuum oven at 50° C., under 500-600 mbar for 1 day.

Synthesis of polymers in a round bottom flask: Controlled amounts of polyols (HAH, PHAH, FHAH, ethylene glycol) were dissolved in DMSO solvent to prepare 2 M (2 mmol diols in 1 mL) of polyol feed solution. Controlled amounts of MDI were dissolved in MIBK solvent to prepare 2 M (2 mmol MDI in 1 mL) of MDI feed solution. The equivalent volume of the polyol solution and the MDI solution was used for synthesis of polyurethanes. Before mixing the monomer feed solutions, both polyol and MDI solutions were preheated at 115° C. for 12 min to remove the moisture in the solutions. The preheated MDI solution was added dropwise to the preheated polyol solution in a round bottom flask with a magnetic stirring bar, and the round bottom flask was capped by a glass lid during the reaction. DMSO/MIBK (1/1, v/v) co-solvent with half the volume of the mixed feed solution was prepared as an additional co-solvent and was added to the polyurethane solutions to reduce the viscosity when the magnetic stirring bar was stopped by high viscosity. Polyurethanes were synthesized within a few minutes (2-5 min), at which point the magnetic stirring bar was stopped by high viscosity or by the solvent-swollen polyurethanes. The reaction was terminated by pouring the polyurethane solutions into 200 mL of Milli-Q water at room temperature. The polyurethanes were rinsed by 200 mL of Milli-Q water 3 times and dried in vacuum oven at 50° C., under 500-600 mbar for 1 day.

Synthesis of molded polyurethanes and polyurethane coatings: 0.508 g of MDI (2 mmol) was dissolved in 0.653 g of MIBK (0.81 mL), and 0.550 g of HAH (2 mmol) was dissolved in 0.892 g of DMSO (0.81 mL). Both feed solutions were preheated at 115° C. for 12 min to remove moisture in the solutions. The preheated HAH and MDI solutions were mixed on a glass dish by a metal spatula at room temperature. Then, the mixed monomer solution was placed in a circular (25 mm diameter) aluminum mold and cured on the hot plate at 95° C. for 10 min. The mold was placed in a vacuum oven at 50° C., under 500-600 mbar (house vacuum) for 20 h to evaporate DMSO and MIBK solvents. 0.619 g of MDI (2.5 mmol) was dissolved in 0.790 g of MIBK (0.99 mL), and 0.710 g of FHAH (2.5 mmol) was dissolved in 1.091 g of DMSO (0.99 mL). Both feed solutions were preheated at 115° C. for 12 min to remove moisture in the solutions. The preheated FHAH and MDI solutions were mixed on a glass dish by a metal spatula at room temperature. Then, the mixed monomer solution was placed in a circular (25 mm diameter) aluminum mold and cured on the hot plate at 80° C. for 10 min. The mold was placed in a vacuum oven at 50° C., under 500-600 mbar (house vacuum) for 23 h to evaporate DMSO and MIBK solvents. The glass dish with the thin layer of the mixed monomer solution was cured at 95-80° C. for 10 min to produce the hydrophobic coating (Figure S13).

Synthesis of molded polyester: 0.69 g (2.5 mmol) of HAH and 0.30 g (2.5 mmol) of succinic acid were dissolved in 1 mL of DMSO at room temperature to prepare a monomer feed solution. 0.03 g (0.1 mmol) of dibutyltin oxide was dissolved in the feed solution at 130° C. for 5 min to form a homogeneous solution. The homogeneous solution was placed into a rectangular Al mold (L:42×W:10×H:5 mm) and reacted on the hot plat, set at 180° C. for 70 min. Then, the temperature of the hot plate decreased to 140° C. and kept for 17 h for DMSO evaporation and curing the polyester.

Tracking esterification during polyester synthesis: 0.69 g of HAH, 0.30 g of succinic acid, and 0.03 g of dibutyltin oxide were mixed with 1 mL of DMSO-$d_6$ solvent in glass vial and placed in oil bath at 130° C. with stirring bar (300 rpm). The glass vial was not capped by a lid to allow the evaporation of water by-product. 0.05 g of polymeric solution was diluted in 0.67 g of DMSO-$d_6$ at different reaction times (60, 300, 470, 870 min) for NMR analysis. After 470 min reaction, 3 g of DMSO-$d_6$ was added to re-dissolve the cured polyester.

Techno-economic analysis: To demonstrate the economic feasibility of the approach, the minimum selling price (MSP) of HAH was computed. The techno-economic analysis follows four steps.

Figure 5:
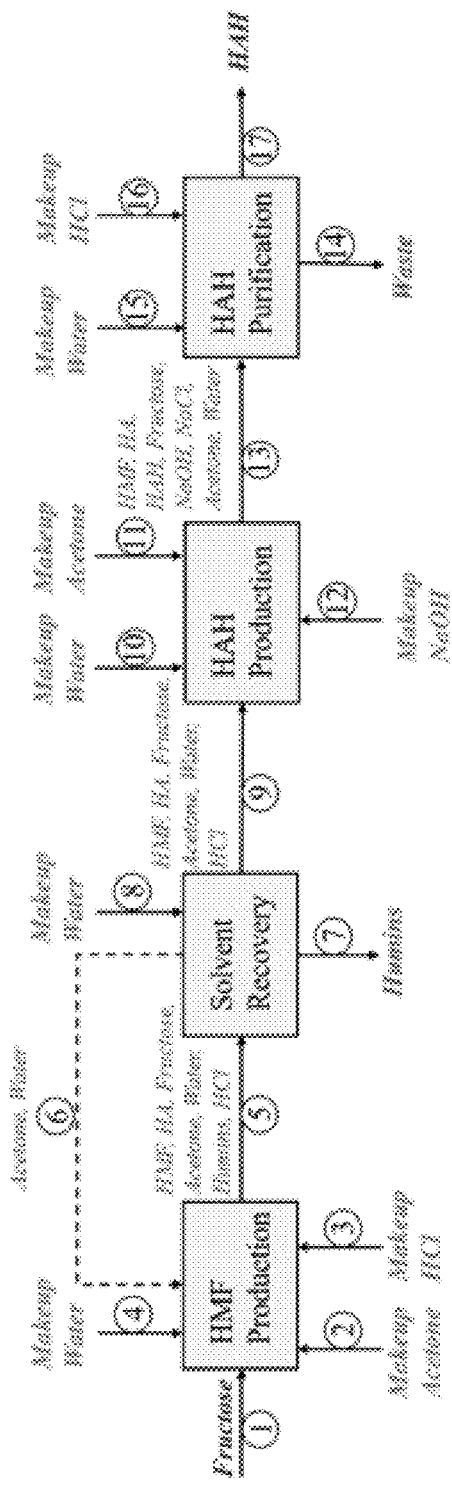
FIG. 5 is a block-flow diagram showing how to produce HAH from fructose.

First, we designed a process to convert fructose to HAH. The process consists of four sections as illustrated in FIG. 5. The models for each of the sections were developed using Aspen Plus (V10 Aspen Technology). While the models for HMF production, HAH production and HAH purification sections are based on experimental results, flash columns in solvent recovery section are simulated using Aspen. In the HMF production section, the yields of HMF, HA, and byproducts from fructose are 85.9%, 2.7%, and 9.3%, respectively. Although the byproducts consist of several components, for simplicity, all the byproducts are labeled as humins. The HMF production reactor (R-1) is operated at 393 K and 10 bar so that all the components are in liquid phase. The stream exiting the reactor then enters the solvent recovery section, where it is passed through a throttling valve into a flash drum (S-1). Due to the reduction in pressure, a fraction of acetone/water is recovered as vapor and recycled to the HMF production section. The liquid outlet of the flash drum is then sent to an adsorption column (S-2), where activated carbon selectively adsorbs humins. Following the separation of humins, the stream enters a vacuum flash column (S-3), where more solvent is recovered in the vapor phase. Before recycling the vapor stream to the HMF production section, the vapor stream is liquified using a refrigerant available at 248 K. The evaporator operates at 293 K. This allows us to meet the required ratio of HMF to HA and acetone that is desirable for the aldol condensation reaction (HMF/Acetone+HA)=2:5 on mole basis. Following the solvent recovery section, HMF is converted to HA and HAH in the aldol-condensation reactor (R-2) in the presence of sodium hydroxide in 3.3% and 86.3% molar yields, respectively. While NaOH is a catalyst for aldol-condensation, acetone acts as both a reactant and solvent. Water, acetone, and NaOH are added such that the concentrations of HMF, acetone, and NaOH at the reactor throat are 655 mM, 325 mM, and 210 mM, respectively. In the HAH purification section, first HCl is added to neutralize NaOH. Thereafter, HAH is purified in a filtration tank (S-4), where it is precipitated and the remaining components including unreacted fructose and HMF, acetone, and HA dissolve in water and are sent to the wastewater treatment facility. Finally, the HAH cake contains some water and it is dried by circulating filtered hot air in a dryer (S-5). Then, we simulate a base design case with a fructose feedstock flow rate of 10 000 kg h−1. The mass and energy balances, temperature and pressure conditions of key process streams were taken (data not shown).

Second, we optimize energy usage by performing heat integration using Aspen Energy Analyzer (V10 Aspen Technology). Without heat integration, the total heat required is 30 MW, and the total cooling required is 30.5 MW. Vacuum evaporator consumes almost half of the total required energy for heating and the condenser that liquifies acetone/water vapor stream from vacuum evaporator expends 60% of the total cooling requirements. Finally, the electricity requirement of the process is estimated to be 48.1 kW. Energy recovery of 6.2 MW is obtained (data not shown) by heat integration of the stream exiting S-1 and the stream entering S-3. It is assumed that the required electricity, heating and cooling are satisfied by external sources.

Third, equipment sizes and the corresponding costs are estimated. The costs of the reactors, filtration tank, adsorption columns and dryer are estimated using the cost data in the NREL report. (R. Davis, N. Grundl, L. Tao, M. J. Biddy, E. C. D. Tan, G. T. Beckham, D. Humbird, D. N. Thompson and M. S. Roni, Tech. Rep. NREL/TP-5100-71949.) The costs of the remaining equipment are estimated using Aspen Process Economic Analyzer (V10 Aspen Technology). All the equipment and material costs are adjusted to a common year (2018) using appropriate cost indices. Total capital investment is computed to be $30.3 million and the operating cost is estimated to be $86.06 million per year (data not shown).

Fourth, we calculate the minimum selling price (MSP) of HAH using discounted cash flow analysis (data not shown). The MSP is computed to be US $1,958 per ton of HAH for a plant with production capacity of 46 kton per year of HAH.

Table 3 shows that the HAH-based polyurethanes are price-competitive with existing polyurethanes, renewable, functional, and compatible with other diols.

TABLE 3

Comparison of HAH to Ethylene Glycol (EG)

| | Ethylene Glycol | HAH |
|---|---|---|
| Market Price ($ per ton) | $500-1.400 | $1000-2,500 (depending on price of fructose) |
| Resources | Ethylene (petroleum) | Fructose or Glucose (biomass) |
| Functionality | Improves stiffness ($C_2H_4$) | UV absorption (C=C) Chemical appending (diene) Cross-linking (ketone0 |
| Upgradability | None | Via hydrogenation |
| Compatibility with Other Diols | Good | Good |

Method to Make HAH:

Solvent effect on fructose dehydration to HMF: The acetone-rich solvent was shown to enhance the fructose dehydration reactivity (FIG. 1A). 0.6 g of fructose was dehydrated in 8 mL of acetone/water solvent with different acetone composition over Amberlyst-15 catalyst. Fructose conversion and HMF yield increased from 38.5% to 71.3% and from 34.7% to 60.1%, respectively, as the acetone/water volume ratio increased from 50% to 70%, respectively, after 150 min dehydration at 393 K. 91.3% fructose was converted to HMF in 78.7% yield at 393 K and 90 min dehydration in acetone/water (80/20, v/v) solvent. HMF selectivity was >76.8% and remained stable in the acetone/water solvent. Therefore, the fructose dehydration reaction demands the utilization of an acetone-rich solvent (>70 vol % acetone) to maximize the HMF production rate.

Figure 1B:
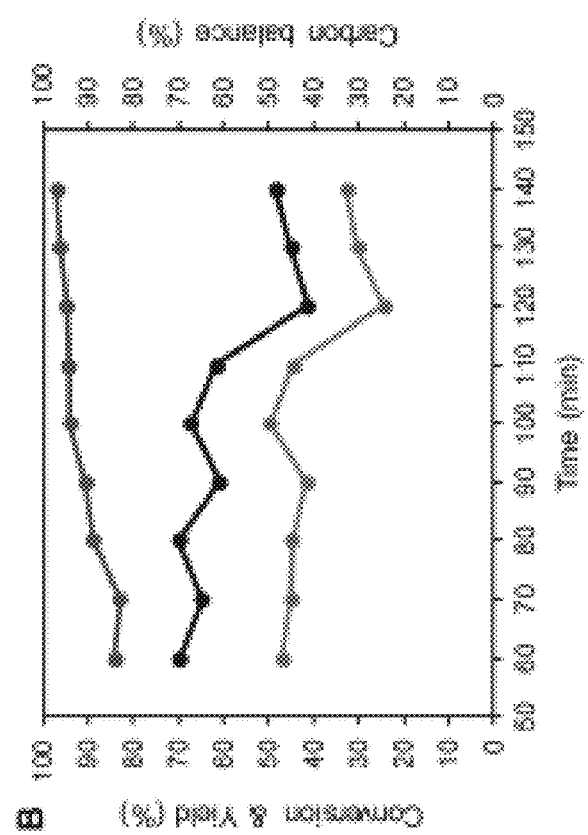
FIG. 1B is a graph showing fructose conversion (blue), HMF yield (red), and carbon balance (black) as a function of reaction time (reaction conditions: 19.6 wt % fructose in acetone/water (50/50, v/v) solvent with 137 mM HCl)
Figure 1C:
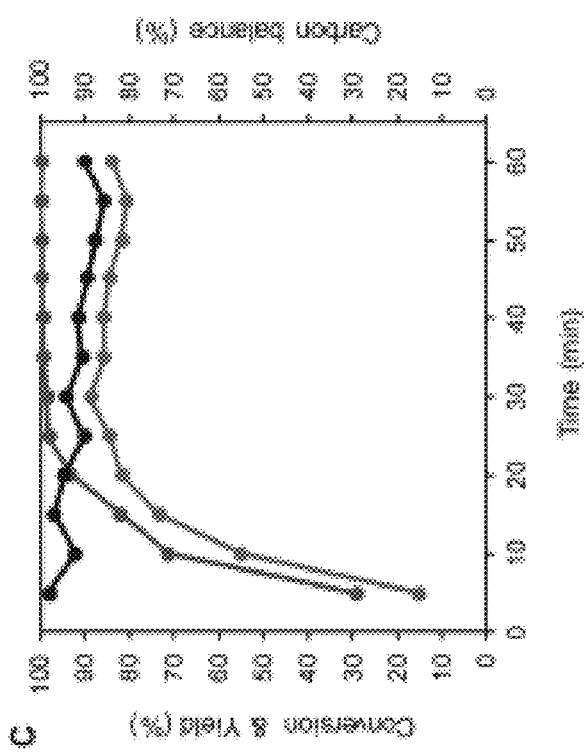
FIG. 1C is a graph showing fructose conversion (blue), HMF yield (red), and carbon balance (black) as a function of reaction time (reaction conditions: 9.1 wt % fructose in acetone/water (75/25, v/v) solvent with 121 mM HCl)

Previous work reported that homogeneous acids are effective catalysts for fructose dehydration in the acetone-rich solvent. (A. H. Motagamwala, K. Huang, C. T. Maravelias and J. A. Dumesic, *Energy Environ. Sci.*, 2019, 12, 2212-2222.) In this respect, Amberlyst-15 catalyst was replaced with HCl to optimize the HMF yield and carbon balance in the dehydration step. Moreover, the solubility of fructose defined the upper limitation of the fructose concentration as a feed. The fructose solubility decreased from 80.0 wt % to 8.3 wt % (data not shown) by adjusting the solvent from pure water to acetone/water (80/20, v/v) mixture at 298 K. Operating a reaction at the upper limitation of the feed concentration results in a higher production rate of the target product (HMF). When fructose dehydration was performed at 393 K for 100 min in an acetone/water (50/50, v/v) solvent containing 137 mM HCl, fructose was almost completely converted (94.0%), resulting in 49.7% HMF yield and 67.3% carbon balance (FIG. 1B). However, the fructose conversion, HMF yield, and carbon balance increased to 98.6%, 88.8%, and 94.2%, respectively, when the reaction was conducted at 393 K for 30 min in an acetone/water (75/25, v/v) solvent containing 121 mM HCl (FIG. 1C). The decrease in water content of the polar aprotic/water co-solvent improved the catalytic turnover rates towards the target products that were catalyzed by acid. Therefore, an appropriate amount (75 vol %) of acetone was used as the solvent for fructose dehydration because addition of acetone leads to higher HMF yield and carbon balance while it decreases the fructose solubility.

Figure 1D:
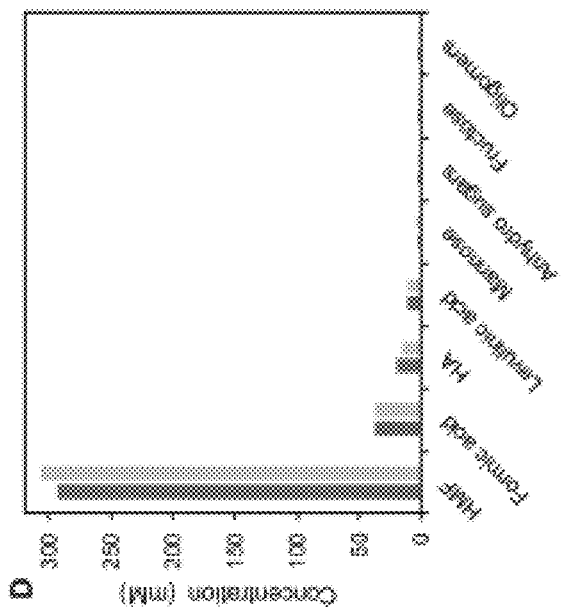
FIG. 1D is a histogram showing chemicals concentration in dehydrated solution before (green bar) and after (yellow bar) the decolorization (decolorization conditions: activated carbon (1.7 wt %) and water (23 wt %) were mixed with dehydrated solution at 298 K for 30 min).

During fructose dehydration, a minor acid-catalyzed aldol condensation was observed, leading to formation of HA. Thus, the dehydrated solution mainly contained HMF, HA, and acidic by-products (formic acid, levulinic acid) after the dehydration step (FIG. 1D). Fructose was also converted to sugar isomers (mannose, anhydro-sugar, sugar oligomer). 3.6% of the carbon of the fructose feed was converted to humins that must be removed before further processing to minimize the acid-catalyzed side-reactions. (S. K. R. Patil and C. R. F. Lund, Energy Fuels, 2011, 25, 4745-4755.) In FIG. 1D, activated carbon selectively adsorbed the humins without significant changes in concentrations of other chemicals. A minor increase in HMF concentration (FIG. 1D) after the humin removal resulted from the measurement error of HPLC by acetone evaporation during the activated carbon treatment.

Figure 2:
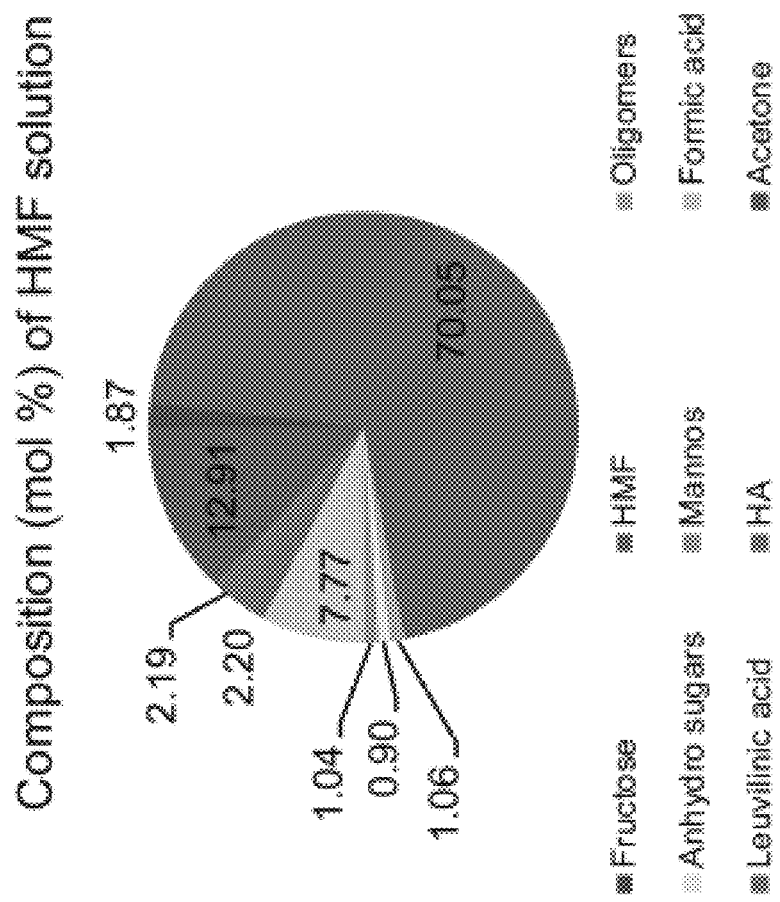
FIG. 2 is a pie chart depicting molar composition of HMF solution (feed for aldol-condensation) after the fructose dehydration, humin decolorization, and acetone distillation.

HMF degradation during vacuum distillation: The distillation of acetone solvent was used to control the molar ratio of HMF and acetone for selective production of HAH by aldol-condensation. Excess amounts of acetone produce HA as a major product from aldol-condensation of fructose-derived HMF and acetone. H. Chang, A. H. Motagamwala, G. W. Huber and J. A. Dumesic, Green Chem., 2019, 21, 5532-5540. Acid-catalyzed degradation of HMF and HA was observed after vacuum distillation at 298 K, 50 mbar. 9.6% of HMF loss and 10% of HA loss were measured by analyzing the distilled solution (data not shown). 14% formic acid was accumulated during the humin formation by degradation of HMF and HA. HMF degradation was suppressed (from 10±5% to 6±3%) by reducing the amount of HCl catalyst (from 120 mM to 60 mM) in the dehydration step, adding water to dilute HCl before the distillation, and decreasing the distillation temperature (from 298 to 293 K). With reduced concentration of HCl catalyst (60 mM), 9.1 wt % fructose in acetone/water (75/25, v/v) solvent resulted in the high HMF yield (85.9%) and carbon balance (96.4%). The major three compounds of the distilled HMF solution were HMF, acetone, and formic acid (FIG. 2). As a result, the HMF yield from fructose slightly decreased (from ~85.9% to ≤83.2%) by acid-catalyzed degradation in the distillation step.

Figure 3:
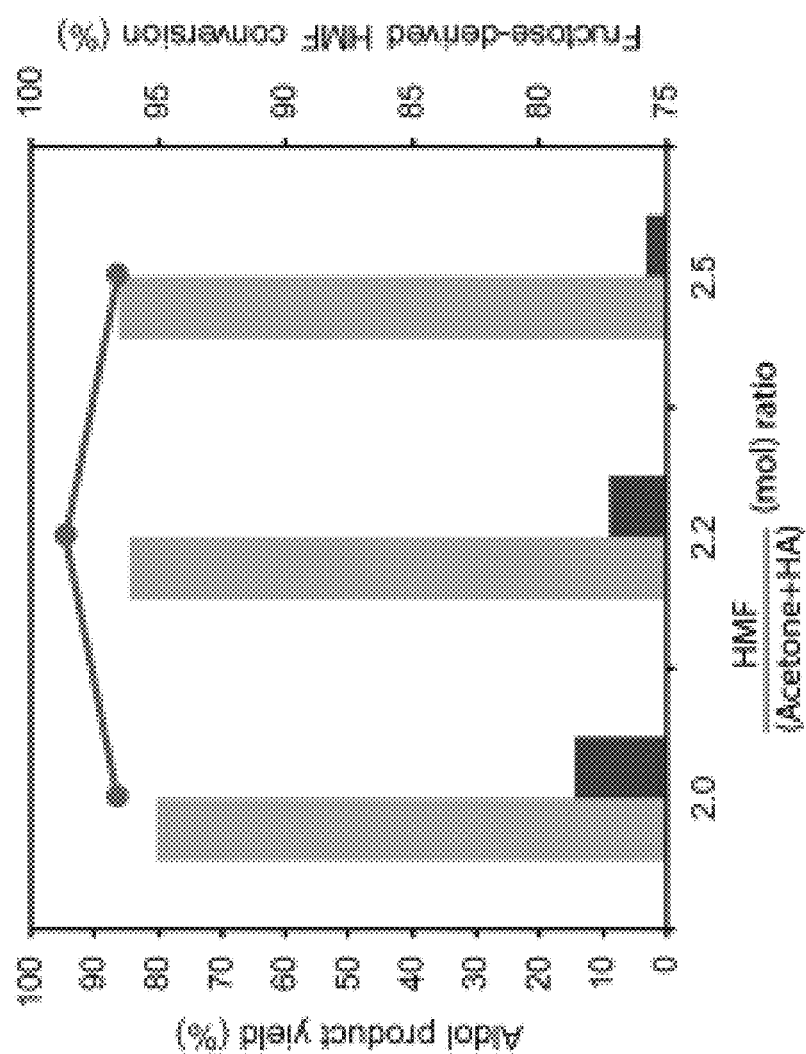
FIG. 3 is a histogram depicting aldol-product yield (HAH: light green bar, HA: dark green bar) and fructose-derived HMF conversion (red dot) as a function of [HMF/Acetone+HA] (mol) ratio (reaction conditions: 0.12 M (70 min), 0.23 M (60 min), 0.21 M (60 min) NaOH for [HMF/Acetone+HA](mol)=2:0; 2:2; and 2:5, respectively, at 308 K.

Aldol-condensation of fructose-derived HMF and acetone: The fructose-derived HMF solution was acidic because it contained acidic by-products (e.g., formic acid, levulinic acid) and HCl catalyst from the dehydration step. Therefore, addition of the controlled amount of NaOH is beneficial to neutralize the acids and catalyze the aldol-condensation. Each concentration of acidic by-product was measured by HPLC, and the concentration of HCl was assumed to be the same as the initial addition in the dehydration step because water solvation prevented the vaporization of HCl in the distillation step. The yield of HAH and HA depended on the initial molar ratio of HMF to acetone sources (HMF/Acetone+HA). The highest HAH yield from the fructose-derived HMF was 86.3% with 93.0% carbon balance when HMF/Acetone+HA (mol) ratio was 2.5. See FIG. 3. Previous work on the aldol-condensation of furfurals and ketones reported that the presence of neutral salts does not affect the reaction kinetics of aldol-condensation. (R. M. West, Z. Y. Liu, M. Peter, C. A. Gartner and J. A. Dumesic, J. Mol. Catal. A: Chem., 2008, 296, 18-27.) Thus, while sugar isomers and humins are possible impurities that can cause side-reactions in aldol-condensation step, the acidic by-products should not cause side-reactions by forming the neutral salts (sodium formate, sodium levulinate) before the aldol-condensation. Humin-free feed for aldol-condensation was prepared by decolorization of the feed over activated carbon to investigate the effect of humins on side-reactions. There was no significant difference in HAH yield and carbon balance between humin-free feed (decolorized feed) and humin-containing feed (untreated feed) (data not shown). This result indicates that the presence of sugar isomers affected the loss (7.0%) in the carbon balance during aldol-condensation. Previous research about the formation of carbohydrate complexes from alkaline degradation of fructose and glucose supports the idea that the sugar isomers induced humin formation. S. P. Moulik, D. Basu and P. K. Bhattacharya, Carbohydr. Res., 1978, 63, 165-172. Moreover, acid-catalyzed degradation of HMF and HA was observed during decolorization at 298 K (data not shown). Accordingly, decolorization of the feed has no benefit for production of HAH.

Crystallization and purification of HAH: The fructose-derived HAH spontaneously crystallized during the aldol-condensation due to its low solubility in water. The water solubility of residual HMF, HA, salts (NaCl, sodium formate, sodium levulinate), and humins was higher than the HAH solubility. 6.2% of the produced HAH was dissolved in water with the water-soluble impurities and discarded with the purge stream after the purification. >99% purity of the purified HAH was measured by HPLC analysis (data not shown). The spontaneous crystallization enables a simple and inexpensive purification to produce high yield (80.9%) of purified HAH (data not shown) from fructose-derived HMF Selective conversion of functional groups in HAH for organic dye and polymer applications (Scheme 2): The reactivity of diol functional group in HAH was investigated by the etherification of HAH with methanol. 93.9% conversion of HAH and the corresponding yield of the etherifed HAH were measured by $^{13}C$ qNMR analysis after 9 h reaction over a $WO_x$—$ZrO_2$ catalyst at 453 K in methanol solvent. The Lewis and Brønsted acid sites of the catalyst acted as catalytic active sites for etherification. The etherification of HAH was highly effective since minimal formation of by-products (<4.5 carbon %) was detected by $^{13}C$ qNMR spectrum (data not shown).

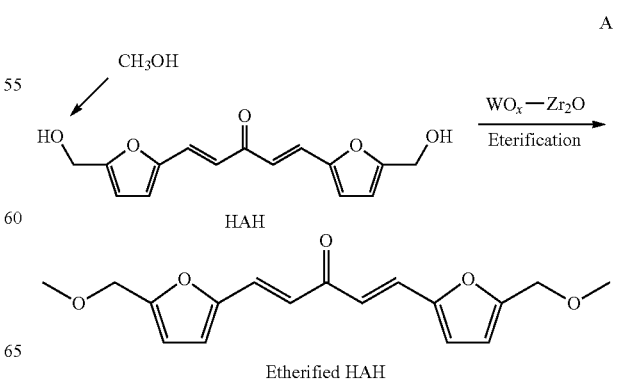

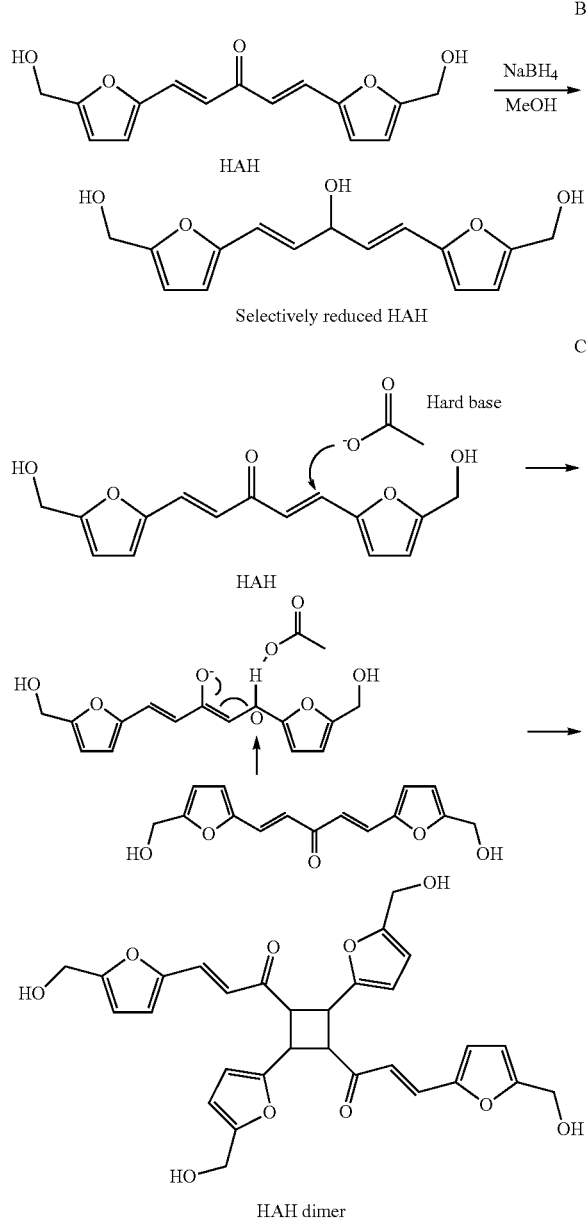

It was elucidated herein that the effective etherification of diol groups in HAH indicated that HAH is a candidate for polyether precursors in the presence of acid catalyst. In addition, the carbonyl group of HAH was converted to a secondary alcohol by selective reduction with the reduction agent, NaBH4. >95% conversion of HAH and the corresponding yield of the selectively reduced HAH were measured by $^{13}$C qNMR analysis. The symmetric structure and trihydroxyl group (two primary and one secondary alcohol groups) in the selectively reduced HAH enables a cross-linker application, like glycerol.

Figure 4A:
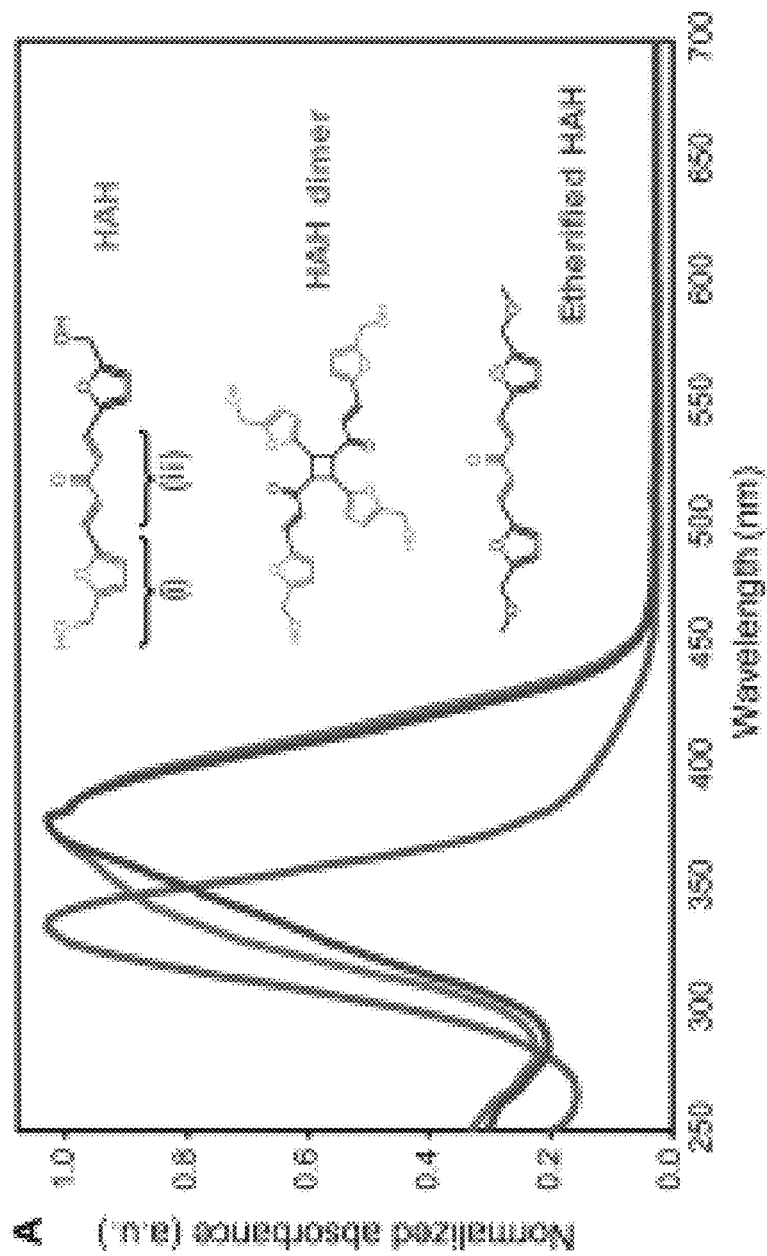
FIG. 4A is a UV-vis absorption spectrum of diluted HAH (green), HAH dimer (red), and etherified HAH (blue) in methanol solvent. (i) (2-Hydroxymethyl furan) and (ii) (1,4-pentadien-3-one) represent the chromophores of HAH.
Figure 4B:
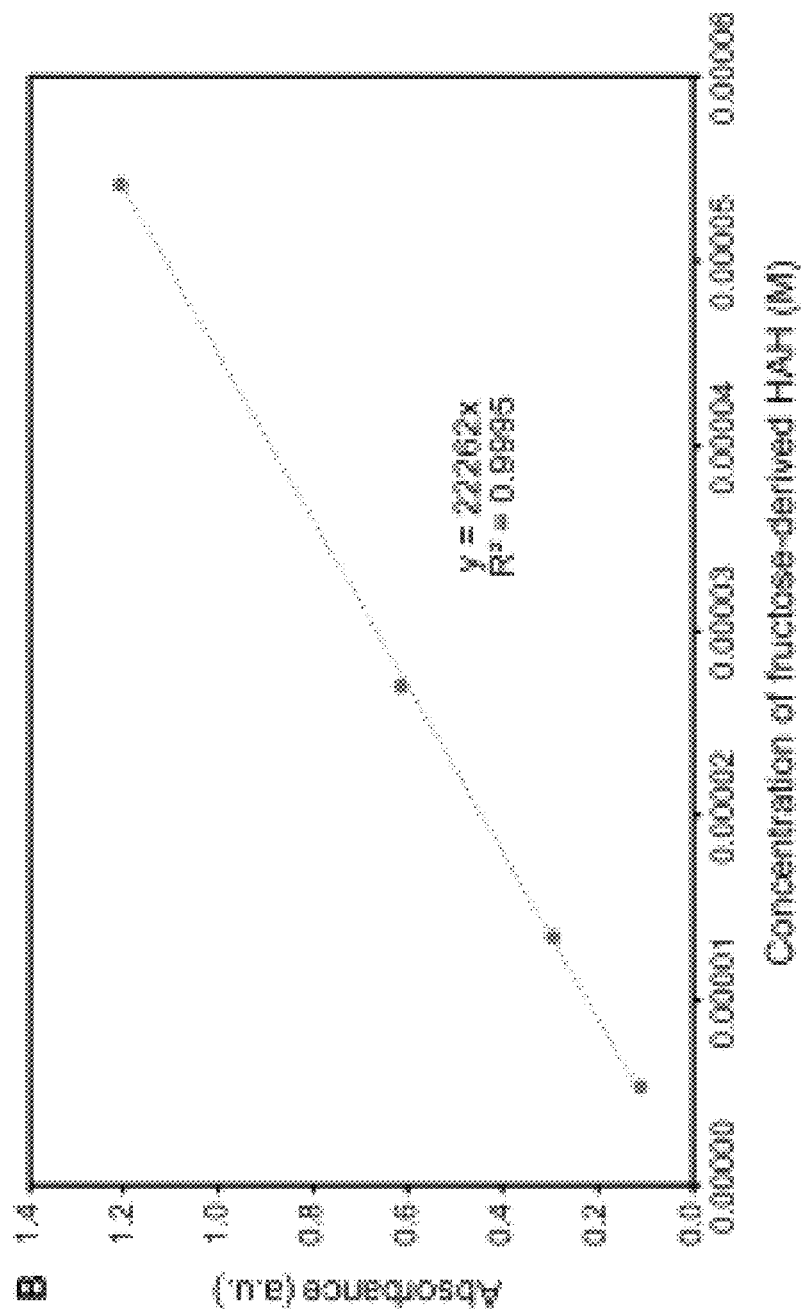
FIG. 4B is a graph of the molar excitation coefficient (slope, $M^{-1}cm^{-1}$) of diluted fructose-derived HAH in methanol solvent at 378 nm UV incident light.

An adjustable UV-vis absorption band and high molar excitation coefficient of the molecule are of critical importance for organic dye applications. The HAH molecule had a broad absorption spectrum from two chromophores, 2-hydroxymethyl furan and 1,4-pentadien-3-one, shown as (i) and (ii), respectively (see FIG. 4A). Shifts in the absorption spectrum of HAH were achieved by dimerization and etherification (FIG. 4A). The dimerization ([2+2] cycloaddition) tuned the (ii) moiety (marked in FIG. 4A) in HAH and produced a HAH dimer at room temperature for 8 days in the presence of acetate anion as a hard base catalyst. 94.3% yield of HAH dimer from HAH was measured by $^{13}$C qNMR analysis after the dimerization. The HAH dimer yielded a narrow UV-vis absorption spectrum by shifting the maximum absorption wavelength from 378 nm (by HAH) to 334 nm. Similarly, etherification eliminated the (i) moiety (marked in FIG. 4A) in HAH and resulted in a sharp absorption band at 378 nm as the maximum absorption wavelength. The molar excitation coefficient of HAH in methanol solvent was measured to be 22 262 $M^{-1}$ $cm^{-1}$ at 378 nm incident UV light (FIG. 4B). This value of HAH is within the range of typical molar excitation coefficients (from 2900 to 43 000 M−1 cm−1) of organic dyes, mono-substituted anthraquinones, in methanol solvent at UV incident light. Note that HAH effectively absorbs UV light (from 300 to 450 nm) and can thus serve as a functional organic dye to protect materials from UV light.

Figure 6:
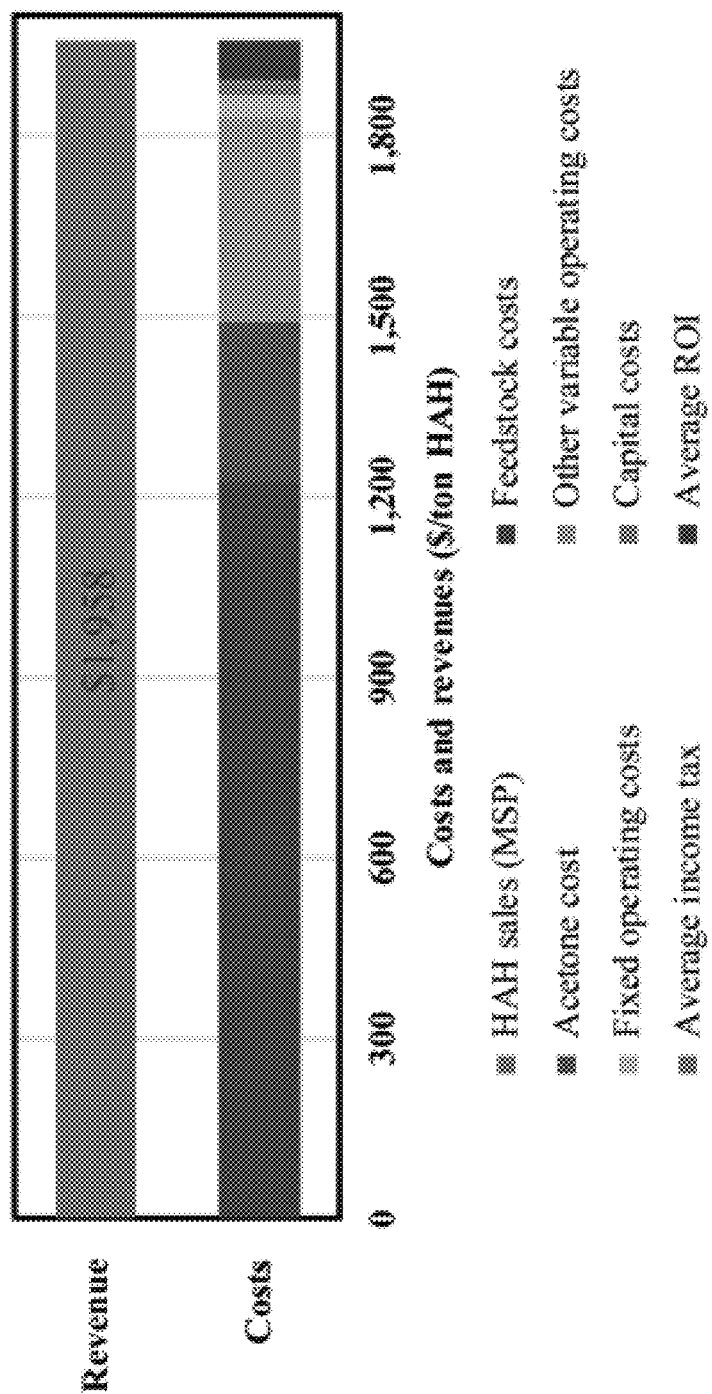
FIG. 6 is a financial breakdown of the costs and revenue of HAH produced using the method disclosed herein.

Techno-economic model analysis of HAH production process: Disclosed herein is a method for converting fructose to HAH (FIG. 5) based on the experimental data noted above. A techno-economic analysis (TEA) for the base design was performed, based on fructose flow rate of 10,000 kg h$^{-1}$. When the price of fructose is assumed to be $650 per ton, the analysis suggests that HAH can be produced using the proposed process at an MSP of $1,958 per ton (FIG. 6). The high yields of HMF and HAH, and the ease of their separation from the solvent lead to favorable economics. The costs of the feedstock (67%) and acetone (14%) are the biggest contributors to the MSP of HAH. Reducing the price of the feedstock and increasing the plant capacity reduces the MSP of HAH (data not shown). For instance, if the price of fructose is reduced to $500 per ton, then the MSP of HAH is estimated to be $1,675 per ton. The results indicate that HAH can be a sustainable and economically competitive alternative to the fossil fuels-derived polyether monomer bisphenol-A ($1,360-$1,720 per ton; ICIS, Asia Chemicals Outlook, 2019) and the organic dye anthraquinone ($3,200-$3,900 per ton; Changzhou AoZun Composite Material Co. Ltd., www.alibaba.com/product-detail/Best-Price-DispersedAnthraquinone-Price_60575920022.html?spm=a2700.7724857.normal List.47.4f1d58d0E7VUz8).

Conclusion on HAH production: Disclosed herein is a process for production of a biomass-derived platform chemical (HAH) by optimizing the catalytic reactions, using green solvents, non-noble metal catalysts, and a simple purification strategy. The acetone/water (75/25, v/v) solvent with low concentration of HCl (60 mM) catalyst allowed for production of HMF in high yield (85.9%) from a high concentration fructose (9.1 wt %) feed. Acetone distillation following HMF production was used to provide a controlled molar ratio of HMF and acetone, with minimal HMF degradation. High yield (86.3%) of HAH from the fructose-derived HMF was achieved by aldol-condensation of the feed with the controlled molar ratio of the reactants (HMF/Acetone+HA)=2:5. The acidic by-products (e.g., formic acid, levulinic acid) and HCl were converted to salts by neutralization before aldol-condensation to minimize side-reactions in the aldol-condensation step. The HAH product was purified simply (>99% purity) by washing with water due to its low solubility in water. The applications of HAH were demonstrated by selective conversion of the functional groups in HAH molecules. The diol in HAH was etherified by methanol over a WO$_x$—ZrO$_2$ catalyst, suggesting that HAH can be a candidate for the polyether precursors. Selective reduction of the carbonyl group in HAH produced a chemical with tri-hydroxyl group, which can be used as a cross-linker for polymer applications. Furthermore, two HAH molecules were dimerized in the presence of acetate anion, leading to a shift in the UV-vis absorption spectrum. The high molar excitation coefficient (22,262 $M^{-1}$ $cm^{-1}$) and the adjustable UV-vis absorption band of HAH molecule enable uses for HAH as a suitable candidate for an organic dye. Finally, techno-economic analysis of the process was employed to evaluate the effectiveness of the process by comparing the minimum selling price of HAH product with market prices of current counterparts from petroleum. The minimum selling price of HAH ($1,958 per ton), calculated at the production rate less than the volume of the potential markets, suggests that the HAH product could replace current markets of organic dyes (anthraquinone market price: $3,200-$3,900 per ton) and polyethers (bisphenol-A market price: $1,360-$1,720 per ton). This biomass-derived platform chemical from the optimized process could thus supply organic dyes, polymers, and liquid fuels from renewable sources in the future.

Figure 7:
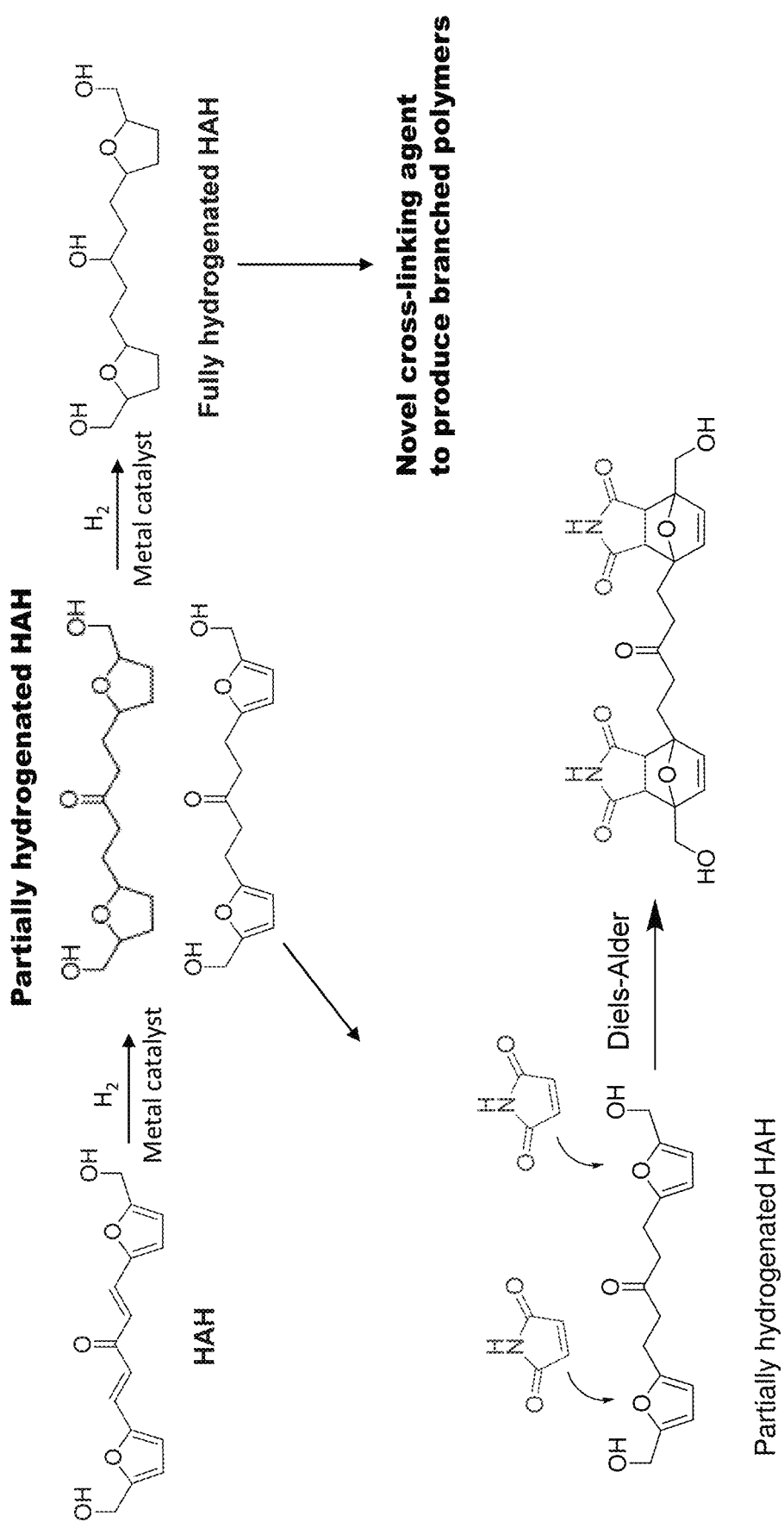
FIG. 7 is a reaction scheme depicting the hydrogenation of HAH over metal catalysts to yield biomass-derived monomers. These monomers can be used as functional monomers in Diels-Alder reactions and as novel cross-linking reagents.

HAH as a Platform Chemical: As illustrated in FIG. 7, HAH can be hydrogenated over non-noble metal catalysts to yield bimass-derived monomers that find use in a host of polymeric applications conventionally filled by fossil fuel-derived chemicals. Referring now to FIG. 7, HAH was partially dehydrogenated, and then fully dehydrogenated, to yield partially dehydrogenated HAH and fully dehydrogenated HAH. The reactions are preferably conducted in a mixed solvent of water and an alcohol, using a metal catalyst, in the presence of molecular hydrogen. Preferred reaction conditions utilize an isopropyl-water-methanol co-solvent at a temperature of from about 120° C. to about 150° C. Preferred metal catalysts are Ru/C, Pd/$Al_2O_3$, Ni/$SiO_2$, and Cu/$Al_2O_3$.

As shown in FIG. 7 the partially hydrogenated HAH is a monomer that includes furan groups that will participate in Diels-Alder reactions with a maleimide. The fully hydrogenated HAH is a polyol with three reactive hydroxyl groups. This compound is useful as a cross-linking reagent to make branched polymers.

Figure 8:
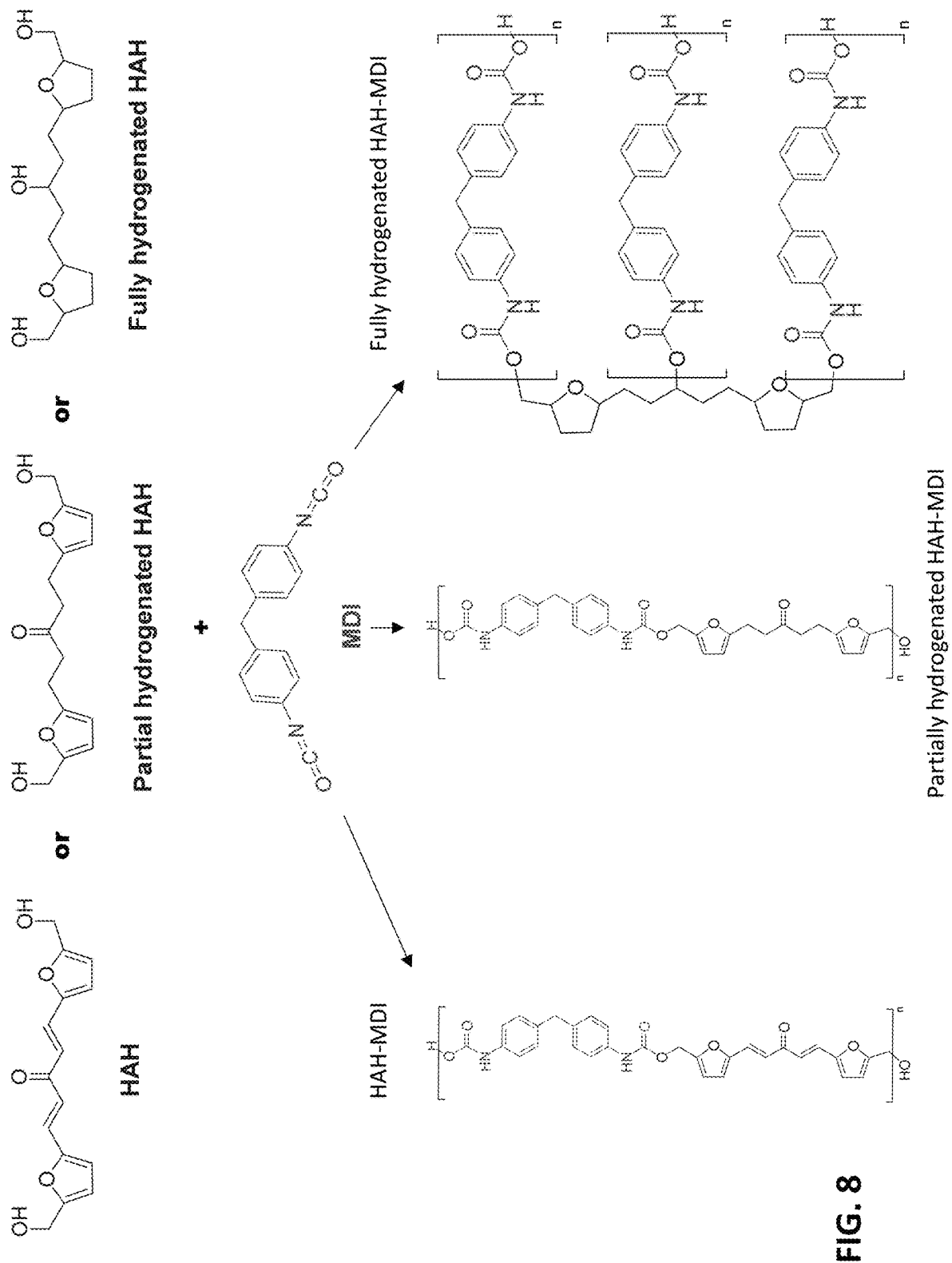
FIG. 8 is a reaction scheme depicting the reaction of the monomers shown in FIG. 7 with a diisocyanate (methyldiphenyldiisocyanate, MDI, is shown as a representative example of a diisocyanate) to yield novel linear and branched polyurethanes.

Further because HAH, partially hydrogenated HAH, and fully hydrogenated HAH are all diols or triols, they can be used as monomers to make polyurethanes by reacting them with an isocyanate, as shown in FIG. 8. In FIG. 8, a representative (and widely employed) diisocyanate, methyldiphenyldiisocyanate ("MDI"), is depicted as representative. This is for brevity only, and any isocyanate capable of forming a urethane bond may be used. Other examples include toluene diisocyanate (TDI), 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane (HuMDI).

In the reactions shown in FIG. 8, HAH, partially hydrogenated HAH, and fully hydrogenated HAH were reacted with MDI at 80-115° C. in a 50/50 mixed solvent of DMSO and MIBK. Water was rigorously excluded from the reactants and the solvents. The reaction of HAH and MDI, shown at the bottom left of FIG. 8, yielded a stiff, solid, linear polymer. The polymer is highly UV-absorbing, having a molar extinction coefficient of about 22,262 $M^{-1}$ $cm^{-1}$.

The reaction of partially hydrogenated HAH and MDI, shown at the bottom middle of FIG. 8, yielded an elastic solid, linear polymer. The polymer is useful to make sealants and elastomers.

Fully hydrogenated HAH, when reacted with an isocyanate, acts as a cross-linker, as shown at the bottom right of FIG. 8. The resulting polymer is a cross-linked, rubbery solid. Because the polymer is cross-linked, it is useful in target applications such as packing foams, insulators, and films.

Figure 9:
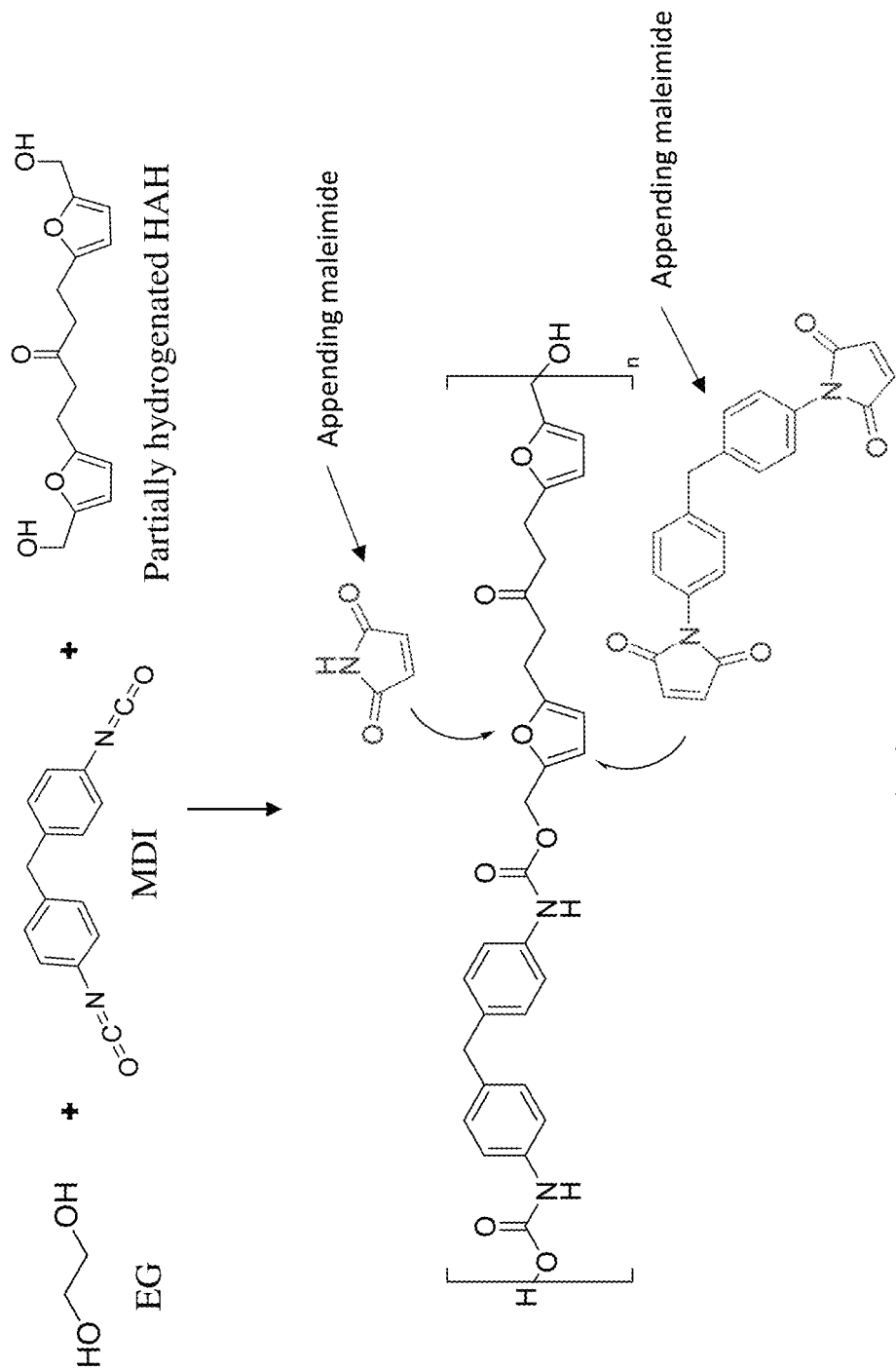
FIG. 9 is a reaction scheme depicting the reaction of a polyol (ethylene glycol, EG, shown as a representative example), a diisocyanate (MDI shown as a representative example) and partially hydrogenated HAH to yield a novel polymer that can be further modified by appending maleimide groups via a Diels-Alder reaction. (See FIG. 7.)

FIG. 9 shows other uses for HAH, partially hydrogenated HAH, and fully hydrogenated HAH. As shown in the figure, for example, the biomass-derived partially hydrogenated HAH can be copolymerized with at least one other polyol, such as ethlylene glycol (EG) and at least one other isocyanate, such as MDI. In the reaction depicted in FIG. 9, 8.6 mol ratio of mixed EG/partially hydrogenated HAH were reacted with 1 mol ratio of MDI. 10.4% of the diols was the partially hydrogenated HAH. The resulting polymer was a yellow stiff solid. It can be further modified by undergoing Diels-Alder reaction with a maleimide.

In the same fashion, HAH and partially hydrogenated HAH can be reacted together as co-monomers with an isocyanate. In an exemplary reaction, a mixture of HAH and partially hydrogenated HAH (23 mol % HAH) was reacted with MDI at a mol ratio of 3.3 diol mixture (HAH and partially hydrogenated HAH) to 1 mol ratio of MDI. The resulting polymers range from stiff solids to deformable solids, to elastic, rubbery solids that reverted to their original shape when crushed.

Synthesis of biomass-derived monomers: A Cu/γ-$Al_2O_3$ catalyst selectively hydrogenated the carbon double bonds (C=C) in the enone groups of HAH to produce partially-hydrogenated HAH (PHAH) in IPA solvent at 120° C. After 12 h of hydrogenation at 120° C., 100 mol % of HAH was converted to PHAH in 91 mol % yield. A dehydrated by-product of this reaction was also detected (Figure S1). At temperatures higher than 120° C., production of the by-products became significant. The Cu catalyst did not hydrogenate the furan rings in the HAH molecule. A Ru/C catalyst hydrogenated HAH to fully-hydrogenated HAH (FHAH) at 180° C. after 1 h of reaction in 100 mol % yield without significant side reactions. See FIG. 7.

Figure 10:
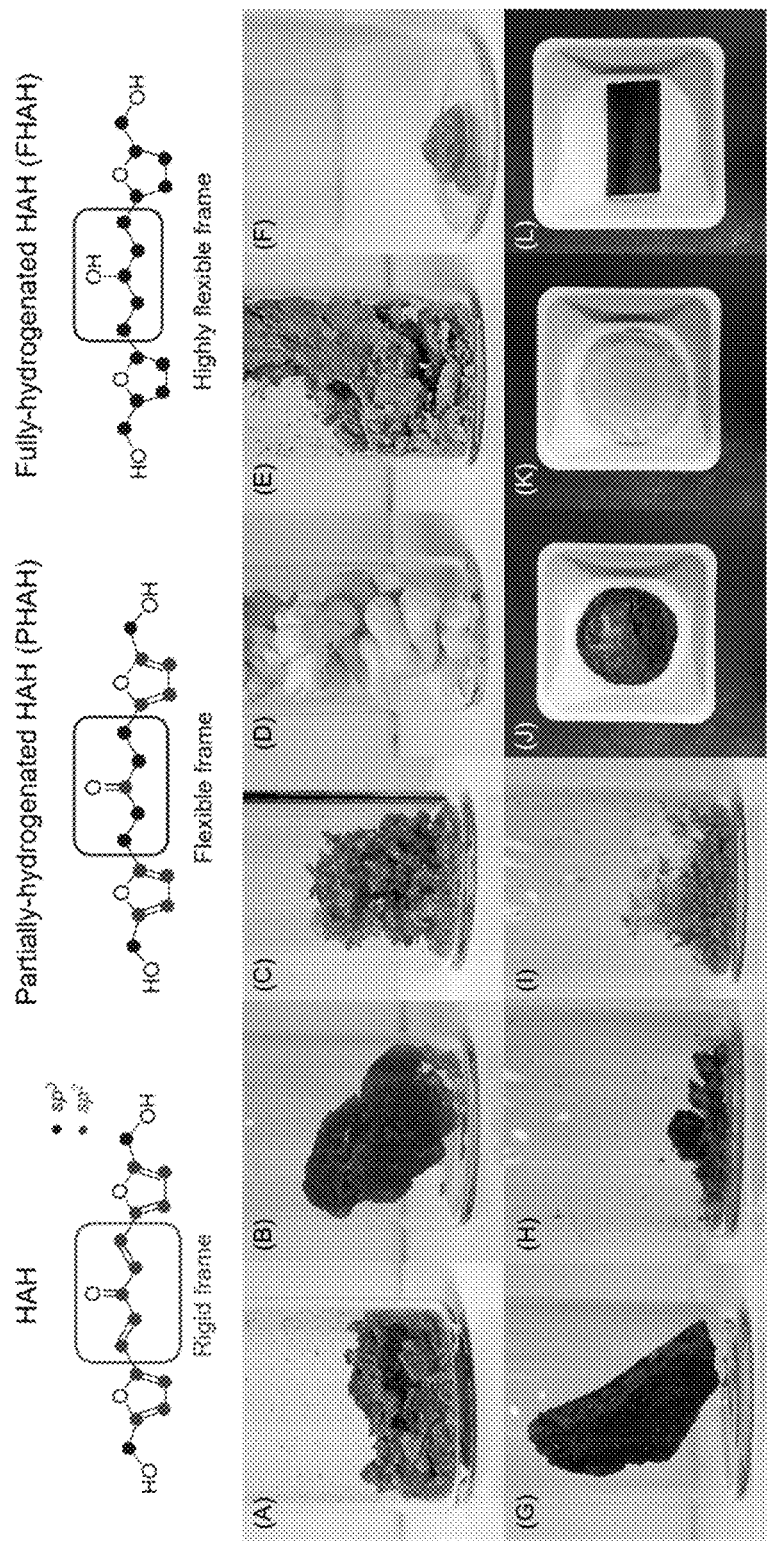
FIG. 10 shows the molecular structure of biomass-derived monomers and pictures of resulting polyurethanes and a polyester: (A) HAH-MDI, (B) PHAH-MDI, (C) FHAH-MDI, (D) EG-MDI, (E) 70% EG-30% PHAH-MDI, (F) PHAH-MDI after 26% Diels-Alder crosslinking, (G) 23% HAH-77% PHAH-MDI, (H) 23% HAH-77% PHAH-MDI after 39% Diels-Alder crosslinking, (I) 70% EG-30% PHAH-MDI after 15% Diels-Alder crosslinking, (J) circular molded HAH-MDI, (K) circular molded FHAH-MDI, and (L) rectangular molded HAH-SA polyester (% represents mol % and EG indicates ethylene glycol, PHAH and FHAH represent partially hydrogenated HAH and fully hydrogenated HAH, respectively).

Synthesis and characterization of biomass-derived polymers: A wide variety of polyurethanes and one polyester were synthesized from HAH, FHAH and PHAH as shown in FIG. 10. HAH solution in DMSO solvent and MDI solution in MIBK (HAH/MDI (mol)=1.0 in feed) were reacted to synthesize the HAH-MDI polyurethane (FIG. 10, panel (A)) without a catalyst. The storage modulus of HAH-MDI was measured to be 1.6-4.0 MPa, and the ratio of loss modulus to storage modulus (tan δ) was 0.17-0.19 by DMA analysis (data not shown). These modulus values indicate that HAH-MDI is a stiff elastic rubber. FHAH-MDI was synthesized (FHAH/MDI (mol)=1.0 in feed), and the storage modulus of FHAH-MDI was measured to be 0.3-2.1 MPa. The value of tan δ of FHAH-MDI ranged between 0.2 and 1.1, indicating that FHAH-MDI is a viscous (energy-dissipating) polyurethane. The difference in the stiffness of the polyurethanes results from the molecular orbitals of the biomass-derived monomers that comprise the backbone of the polyurethanes. HAH contains $sp^2$ carbons, which provide a rigid frame of the monomer, whereas FHAH contains $sp^a$ carbons and has high flexibility. Consequently, HAH-based polyurethane is a stiff rubber, but the highly flexible structure of FHAH provides a soft energy-dissipating rubber. The polyurethanes can be shaped by curing the monomer solution in molds or used to provide hydrophobic coatings on glass by covering the glass with a thin layer of the monomer solution, followed by curing. The color of HAH-MDI coating was yellow because HAH units absorb UV light at large molar excitation coefficient (22,262 M$^{-1}$cm$^{-1}$ at 378 nm). HAH-MDI could thus be used as an UV-block coating. The energy-dissipating property of FHAH-MDI is useful in applications such as impact-resistant coatings or in packaging. HAH-MDI is a linear polyurethane that comprises equivalent diol and diisocyanate units in the polymeric structure (by $^{13}$C qNMR). However, FHAH-MDI is a branched polyurethane with a 1 to 2 molar ratio of FHAH and MDI (by $^{13}$C qNMR).

Synthesis of polymers from blended diols and MDI: The biomass-derived monomers can be blended with each other or with petroleum-based monomers, such as ethylene glycol (EG), to produce polyurethanes. 2.33 equivalent EG and PHAH were used as a diol feed for synthesizing a blended polyurethane with MDI (70% EG-30% PHAH-MDI; see FIG. 10, Panel (E)). This blended polyurethane was characterized by HSQC and $^{13}$C qNMR (data not shown). PHAH can be blended with HAH and produced a blended polyurethane (23% HAH-77% PHAH-MDI; FIG. 10, panel (G)). The blended polyurethane was characterized by HSQC and $^{13}$C qNMR (data not shown). The PHAH units in the blended polyurethanes can be used to provide maleimide-appending sites by Diels-Alder reaction.

Figure 11A:
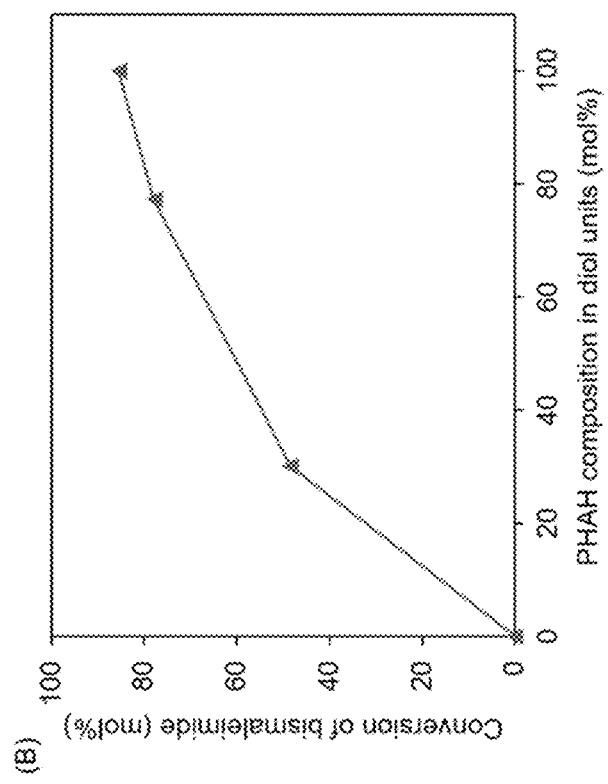
FIG. 11A is a graph showing the concentration of the consumed maleimide by Diels-Alder reaction with furan moiety in PHAH as a function of reaction time (measured by HPLC).
Figure 11B:
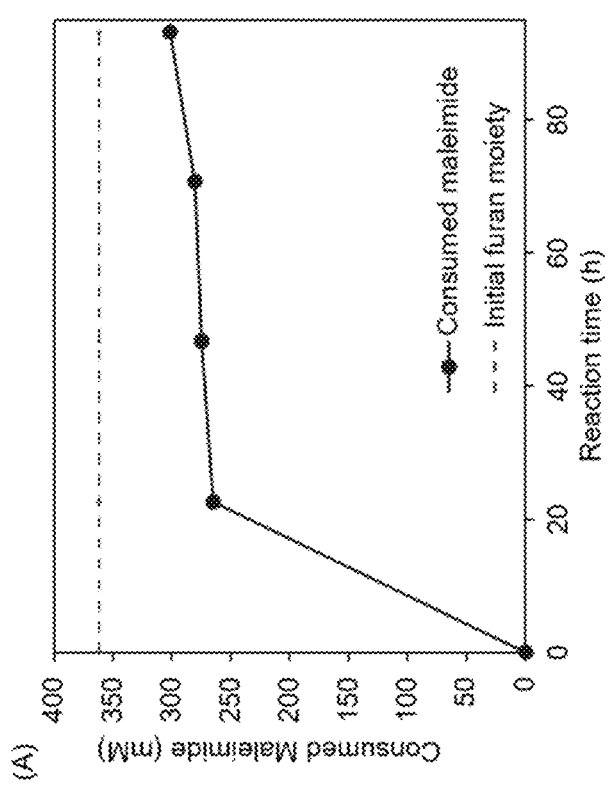
FIG. 11B is a graph showing the conversion of bismaleimide as a function of PHAH unit composition in polyurethane structure.
Figure 11C:
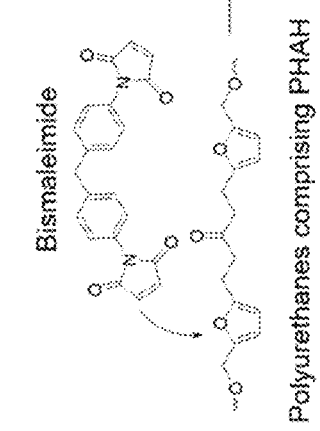
FIG. 11C is a schematic Diels-Alder reaction pathway for PHAH and polyurethanes comprising PHAH.
Figure 11C:
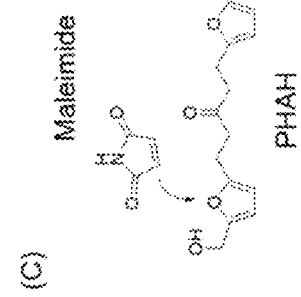

Diels-Alder reactions of polymers comprising PHAH: The diene functionality in the furan ring of HAH has no reactivity for Diels-Alder reaction with maleimide because of a nearby electron-withdrawing C=C bond. Catalytic conversions of electron-withdrawing groups to electron-donating groups activated the diene functionality in the furan ring and enabled Diels-Alder reaction. See FIG. 11C. Thus, maleimide was coupled with the furan ring of PHAH in THF solvent at 50° C. after hydrogenation converted the electron-withdrawing C=C bonds to electron-donating C—C bonds. After 93 h of Diels-Alder reaction, 83 mol % of the furan moiety (Maleimide/furan in feed (mol)=1.48) in PHAH was coupled with maleimide, as shown in FIG. 11A. The molecular structure of Diels-Alder coupled PHAH and maleimide were characterized by HSQC and $^{13}$C qNMR (data not shown).

PHAH was reacted with an equivalent amount of MDI to synthesize PHAH-MDI polyurethane (FIG. 10, panel (B)). Diels-Alder reaction of PHAH-derived polyurethanes with bismaleimide was then investigated. Bismaleimide was dissolved in THF solvent and reacted with the THF-swollen PHAH-MDI. The bismaleimide provided 26 mol % of crosslinking by Diels-Alder reaction (PHAH unit/Bismaleimide (mol)=3.34 in feed, 86 mol % conversion of bismaleimide after 69 h; FIG. 10, panel (F)). The blended polyurethane with 23 mol % of HAH and 77 mol % of PHAH as diol units (HAH-PHAH-MDI) was reacted with bismaleimide and provided 39 mol % of Diels-Alder crosslinking (PHAH unit/Bismaleimide (mol)=2.00 in feed, 78 mol % conversion of bismaleimide after 70 h; FIG. 10, panel (H)). Another blended polyurethane that was comprised of 70 mol % EG and 30 mol % PHAH as diol units (EG-PHAH-MDI) showed 48 mol % conversion of bismaleimide after 70 h of reaction (PHAH unit/Bismaleimide (mol)=1.00 in feed, 15 mol % of Diels-Alder crosslinking; FIG. 10, panel (I)). The conversion of bismaleimide remained constant (48 mol %) after 165 h of reaction. Thus, the conversion of bismaleimide by Diels-Alder reaction decreased as the molar composition of PHAH units in polyurethanes decreased. See FIG. 11B. The structures of the crosslinked PHAH-MDI and EG-PHAH-MDI were analyzed by NMR analysis (data not shown), but the structure of HAH-PHAH-MDI was not characterized by NMR because the polymer lost its solubility in DMSO-do solvent after Diels-Alder reaction.

Thermal properties of biomass-derived polymers: The thermal properties of polyurethanes were measured by DSC and TGA; see Table 4. Exothermic transitions include evaporation of solvents and moisture or melting of the polyurethanes. Endothermic transitions involve the formation of crosslinking or crystallization of polyurethanes. The temperatures, corresponding to 20 wt % and 50 wt % of thermal degradation of the polyurethanes, were represented as $T_{xx\%}$ in Table 4 and are used to compare the thermal stability of polyurethanes. When HAH replaced EG in the polyurethane the $T_{20\%}$ and $T_{50\%}$ increased from 125 to 240° C. and from 310 to 490° C., respectively. HAH-MDI had no glass transition temperature after an exothermic transition at 237° C., while the glass transition temperature of EG-MDI (FIG. 10, panel (D)) was 80° C. The addition of 23 mol % HAH into PHAH-MDI (HAH-PHAH-MDI) increased the glass transition temperature, $T_{20\%}$ and $T_{50\%}$ of the polyurethane from 68 to 93° C., from 130 to 175° C., and from 320 to 390° C., respectively. These results demonstrate that different composition of HAH units in polyurethanes can be used to tune the thermal stability of polyurethanes. The glass transition temperature, $T_{20\%}$, and $T_{50\%}$ of PHAH were similar to those of EG-MDI. However, 26 mol % of Diels-Alder crosslinking (PHAH-MDI after Diels Alder) increased the glass transition temperature from 68 to 134° C. with higher $T_{20\%}$ (180° C.) and $T_{50\%}$ (470° C.). The addition of Diels-Alder crosslinking (39 mol %) to HAH-PHAH-MDI (HAH-PHAH-MDI after Diels-Alder) increased $T_{50\%}$ of the HAH-PHAH-MDI from 390 to 510° C. Moreover, the HAH-PHAH-MDI after Diels-Alder became thermally stable after exothermic transition (200° C.) and the glass transition temperature was not observed in 2nd and 3rd cycles of DSC. PHAH was blended with EG-MDI (EG-PHAH-MDI) and increased the glass transition temperature from 80 to 134° C., but $T_{50\%}$ was not significantly improved. The glass transition temperature (from 134 to 179° C.) and $T_{50\%}$ (from 330 to 440° C.) of EG-PHAH-MDI were further improved after PHAH units formed 15 mol % of Diels-Alder crosslinking. The PHAH can be used to produce functional polyurethanes with tunable thermal stability by controlling the degree of Diels-Alder crosslinking with bismaleimide. Polyurethanes are used as thermal insulation materials. A higher specific heat capacity of insulators indicates higher performance of the thermal insulation because materials with high specific heat capacity can absorb more heat energy before they increase temperature. HAH-derived polyurethanes had higher specific heat capacity (0.9-1.5 J ° C.$^{-1}$ g$^{-1}$) than EG-MDI (0.6-0.9 J ° C.$^{-1}$ g$^{-1}$). Diels-Alder crosslinking did not affect the specific heat capacity. These results indicate that the thermal properties, such as glass transition temperature and thermal stability, of HAH-derived polyurethanes can be tuned.

TABLE 4

Thermal properties and the weight-averaged molecular weight ($\overline{MW}$) of biomass-derived polymers

| | $\overline{MW}$ (g mol$^{-1}$) | PD | Endothermic transition (° C.) | Exothermic transition (° C.) | Glass transition (° C.) | $C_p$ (J ° C.$^{-1}$ g$^{-1}$) | $T_{20\%}$ (° C.) | $T_{50\%}$ (° C.) | Char yield (wt %) |
|---|---|---|---|---|---|---|---|---|---|
| EG-MDI | — | — | 238 | — | 80 | 0.6-0.9 | 125 | 310 | 10 |
| HAH-MDI | 4,513 | 1.62 | 175 | 237 | — | 0.9-1.5 | 240 | 490 | 38 |
| PHAH-MDI | 10,262 | 2.18 | 196 | — | 68 | 0.9-1.5 | 130 | 320 | 21 |
| FHAH-MDI | 3,883 | 1.99 | 191 | — | 87 | 0.9-1.5 | 165 | 360 | 7 |
| PHAH-MDI after 26% Diels-Alder crosslinked | — | — | 127 | 200 | 134 | 0.9-1.5 | 180 | 470 | 35 |
| HAH-PHAH-MDI$^a$ | 8,312 | 2.13 | 180 | — | 93 | 0.9-1.5 | 175 | 390 | 30 |
| HAH-PHAH-MDI after 39% Diels-Alder crosslinked | — | — | 126 | 200 | — | 0.9-1.5 | 170 | 510 | 40 |
| EG-PHAH-MDI$^b$ | 15,583 | 3.26 | 170 | 220 | 134 | 0.9-1.5 | 210 | 330 | 19 |
| EG-PHAH-MDI after 15% Diels-Alder crosslinked | — | — | 104 | 215 | 179 | 0.9-1.5 | 270 | 400 | 21 |
| HAH-SA | 1,139 | 1.24 | 133 | — | 73 | 0.9-1.5 | 220 | 480 | 40 |

($\overline{MW}$ of THF-solubilized polyurethanes were measured by GPC;
Exo and endothermic transitions were measured at 1st heating cycle of DSC;
Glass transition temperature and specific heat capacity ($C_p$) were measured at 2nd heating and cooling cycle of DSC;
$^a$Diol units consisted of 23 mol % of HAH and 77 mol % of PHAH;
$^b$Diol units consisted of 70 mol % of EG and 30 mol % of PHAH;
PD abbreviates polydispersity).

Synthesis and characterization of a biomass-derived polyester: Succinic acid (SA) can be synthesized from biomass feedstocks including glucose, furfural, and lignin. The esterification of HAH and SA produces a renewable polyester (HAH-SA, FIG. 10, panel (L)). DMSO solvent dissolved the solid phase monomers and dibutyltin oxide catalyst in a homogeneous solution for solution polymerization. $^{13}$C qNMR analysis was used to track the formation of ester bonds between HAH and SA at 130° C. (data not shown). After 870 min of esterification, 50 mol % of HAH (by $^{13}$C qNMR) was converted to the polyester. The thermal stability temperatures of HAH-SA were 220° C. and 480° C. for the $T_{20\%}$ and $T_{50\%}$, respectively. After heating at 800° C., 40 wt % of the polyester was converted to char. The glass transition and endothermic transition temperatures were measured to be 73° C. and 133° C., respectively. The specific heat capacity of the polyester was 0.9-1.5 J ° C.$^{-1}$ g$^{-1}$. The storage modulus of HAH-SA was measured to be 1.0-2.6 MPa, and tan δ (=E"/E') was 0.15-0.23 by DMA analysis. Based on the properties of the HAH-SA polyester, the polyester could be used as a flexible UV-blocking packaging material to replace polyethylene terephthalate (PET).

Conclusion: HAH was made from a biomass-derived platform chemical (HMF) and selectively upgraded HAH by hydrogenation over Cu or Ru catalysts in high yield (≥91 mol %). Selective hydrogenation of HAH enables changes in chemical functionalities of each monomer. As a result, biomass-derived monomers, such as HAH, PHAH, and FHAH, were demonstrated to become functional monomers for production of various polymers with UV absorption properties, binding sites for Diels-Alder reactions, and crosslinking ability. The high UV absorbance, sp$^2$ carbon-based rigid frame, thermal, and mechanical properties of HAH-derived polymers indicate that these materials can be used in UV-block coatings, thermal insulators, and packaging applications. The Diels-Alder reaction of PHAH units provides tunable thermal stability of polyurethanes and also could be used to deliver maleimide-based antimicrobial chemicals or to synthesize self-healing functional polyurethanes. FHAH is a flexible symmetric triol and can be used to produce an energy-dissipating rubber for packaging or coating applications. It could be a substitute for glycerol that serves as a crosslinking agent to synthesize branched polymers. HAH, PHAH and FHAH can be blended with each other or with petroleum-based diols (such as ethylene glycol) to further tune the properties and produce sustainable, economically viable, performance-advantaged polymers.

These results show that the method described herein can be used to make biomass-derived polyurethanes and polyesters that can be used in place of fossil fuel-derived polyurethanes.

What is claimed is:

1. A method of making biomass-derived polymers, the method comprising:
reacting a first polyol wherein the first polyol is biomass-derived and comprises a Formula I compound selected from the group consisting of:

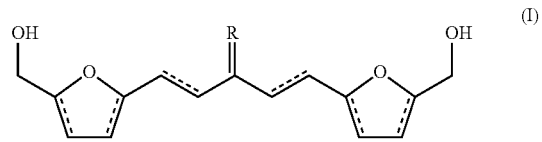

(I)

wherein dashed bonds are single or double bonds and R is selected from =O or —OH;

with a comonomer selected from the group consisting of a diisocyanate or a dicarboxylic acid for a time, and at a temperature to yield a polymeric product.

2. The method of claim 1, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

3. The method of claim 1, wherein, prior to reacting the first polyol with the diisocyanate or dicarboxylic acid, the first polyol is blended with a second polyol that is structurally distinct from the first polyol.

4. The method of claim 3, wherein the second polyol is selected from the group consisting of linear or branched alkylene glycols, sugar alcohols, polyether polyols, polyester polyols, polycarbonate polyols, polycaprolactone polyols, polybutadiene polyol, and polysulfide polyols.

5. The method of claim 3, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

6. The method of claim 1, wherein the first polyol comprises a Formula I compound where all the dashed bonds are double bonds and R is O.

7. The method of claim 6, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

8. The method of claim 6, wherein, prior to reacting the first polyol with the diisocyanate or dicarboxylic acid, the first polyol is blended with a second polyol that is structurally distinct from the first polyol.

9. The method of claim 8, wherein the second polyol is selected from the group consisting of linear or branched alkylene glycols, sugar alcohols, polyether polyols, polyester polyols, polycarbonate polyols, polycaprolactone polyols, polybutadiene polyol, and polysulfide polyols.

10. The method of claim 8, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

11. The method of claim 1, wherein the first polyol comprises:

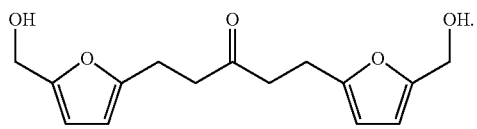 [SMILES: O=C(CCc1ccc(CO)o1)CCc1ccc(CO)o1]

12. The method of claim 11, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

13. The method of claim 11, wherein, prior to reacting the first polyol with the diisocyanate or dicarboxylic acid, the first polyol is blended with a second polyol that is structurally distinct from the first polyol.

14. The method of claim 13, wherein the second polyol is selected from the group consisting of linear or branched alkylene glycols, sugar alcohols, polyether polyols, polyester polyols, polycarbonate polyols, polycaprolactone polyols, polybutadiene polyol, and polysulfide polyols.

15. The method of claim 13, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

16. The method of claim 11, further comprising, prior to reacting the first polyol with the diisocyanate or dicarboxylic acid, reacting the first polyol with a maleimide, and N-substituted maleimides.

17. The method of claim 11, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

18. The method of claim 11, wherein, prior to reacting the first polyol with the diisocyanate or dicarboxylic acid, the first polyol is blended with a second polyol that is structurally distinct from the first polyol.

19. The method of claim 18, wherein the second polyol is selected from the group consisting of linear or branched alkylene glycols, sugar alcohols, polyether polyols, polyester polyols, polycarbonate polyols, polycaprolactone polyols, polybutadiene polyol, and polysulfide polyols.

20. The method of claim 18, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

21. The method of claim 1, wherein the first polyol comprises:

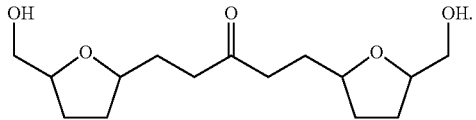 [SMILES: O=C(CCC1CCC(CO)O1)CCC1CCC(CO)O1]

22. The method of claim 21, wherein the diisocyanate is selected from the group consisting methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

23. The method of claim 21, wherein, prior to reacting the first polyol with the diisocyanate or dicarboxylic acid, the first polyol is blended with a second polyol that is structurally distinct from the first polyol.

24. The method of claim 23, wherein the second polyol is selected from the group consisting of linear or branched alkylene glycols, sugar alcohols, polyether polyols, polyester polyols, polycarbonate polyols, polycaprolactone polyols, polybutadiene polyol, and polysulfide polyols.

25. The method of claim 23, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

26. The method of claim 1, wherein the first polyol comprises:

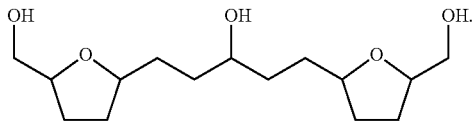 [SMILES: OCC1CCC(CCC(O)CCC2CCC(CO)O2)O1]

27. The method of claim 26, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

28. The method of claim 26, wherein, prior to reacting the first polyol with the diisocyanate or the dicarboxylic acid, the first polyol is blended with a second polyol that is structurally distinct from the first polyol.

29. The method of claim 28, wherein the second polyol is selected from the group consisting of linear or branched alkylene glycols, sugar alcohols, polyether polyols, polyester polyols, polycarbonate polyols, polycaprolactone polyols, polybutadiene polyol, and polysulfide polyols.

30. The method of claim 28, wherein the diisocyanate is selected from the group consisting of methyldiphenyldiisocyanate, toluene diisocyanate, 1,6-hexamethylene diisocyanate, 1-isocyanato-3-isocyanatomethyl-3,5,5-trimethyl-cyclohexane, and 4,4'-diisocyanato dicyclohexylmethane; and the dicarboxylic acid is selected from the group consisting of oxalic, malonic, succinic, glutaric, adipic, picric, phthalic, isophthalic, terephthalic, biphenyl-2,2'-dicarboxylic, and 2,6-naphthalenedicarboxylic acid acids.

31. A polymer comprising
a first co-monomer comprising a diisocyanate or a dicarboxylic acid; and
a second co-monomer which, prior to polymerization, comprises a compound of Formula I:

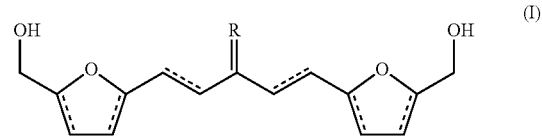

wherein dashed bonds are single or double bonds and R is selected from =O or —OH.

32. The polymer of claim 31, wherein the first co-monomer comprises a diisocyanate.

33. The polymer of claim 31, wherein the first co-monomer comprises a dicarboxylic acid.

34. A polymer made by the method of claim 1.

35. A polymer made by the method of claim 16.

* * * * *